US011012585B2

(12) United States Patent
Hashimoto et al.

(10) Patent No.: US 11,012,585 B2
(45) Date of Patent: May 18, 2021

(54) IMAGE PROCESSING APPARATUS, IMAGE PROCESSING SYSTEM, IMAGE PROCESSING METHOD, AND NON-TRANSITORY COMPUTER-READABLE STORAGE MEDIUM

(71) Applicants: Ayumu Hashimoto, Kanagawa (JP); Masamoto Nakazawa, Kanagawa (JP); Masashi Watanabe, Tokyo (JP); Masahiro Itoh, Kanagawa (JP)

(72) Inventors: Ayumu Hashimoto, Kanagawa (JP); Masamoto Nakazawa, Kanagawa (JP); Masashi Watanabe, Tokyo (JP); Masahiro Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/431,954

(22) Filed: Jun. 5, 2019

(65) Prior Publication Data

US 2020/0053229 A1 Feb. 13, 2020

(30) Foreign Application Priority Data

Aug. 10, 2018 (JP) .............................. JP2018-152125

(51) Int. Cl.
*H04N 1/00* (2006.01)
*H04N 1/60* (2006.01)

(52) U.S. Cl.
CPC ......... *H04N 1/0087* (2013.01); *H04N 1/6072* (2013.01)

(58) Field of Classification Search
CPC .... H04N 1/0087; H04N 1/6072; H04N 5/332; H04N 1/40056; H04N 1/00326; H04N 1/32128; H04N 1/40093
USPC ................................... 358/1.15, 1.13
See application file for complete search history.

(56) References Cited

U.S. PATENT DOCUMENTS

2005/0134622 A1* 6/2005 Yamaguchi ........... G06T 1/0028
                                                        347/15
2006/0132642 A1* 6/2006 Hosaka ............... H04N 5/23229
                                                        348/370
2009/0065679 A1 3/2009 Tanimoto
(Continued)

FOREIGN PATENT DOCUMENTS

CN 101031016 A 9/2007
CN 103646195 A 3/2014
(Continued)

OTHER PUBLICATIONS

Extended European Search Report dated Jan. 7, 2020 in European Patent Application No. 19180464.0, citing documents AA-AE and AO therein, 6 pages.
(Continued)

*Primary Examiner* — Miya J Williams
*Assistant Examiner* — Darryl V Dottin
(74) *Attorney, Agent, or Firm* — Oblon, McClelland, Maier & Neustadt, L.L.P.

(57) ABSTRACT

An image processing apparatus includes a sensor and circuitry. The sensor is configured to read a visible spectrum and an invisible spectrum of an image. The circuitry is configured to separate the image read into a visible image and an invisible image and perform different image correction processes on the visible image and the invisible image, respectively.

19 Claims, 21 Drawing Sheets

(56) References Cited

U.S. PATENT DOCUMENTS

| | | | |
|---|---|---|---|
| 2009/0237756 A1* | 9/2009 | Hirokawa | H04N 1/46 |
| | | | 358/518 |
| 2011/0254916 A1* | 10/2011 | Fan | G03B 35/18 |
| | | | 348/41 |
| 2014/0218538 A1 | 8/2014 | Choi | |
| 2016/0065865 A1* | 3/2016 | Shiokawa | H04N 9/04553 |
| | | | 348/164 |
| 2017/0244853 A1 | 8/2017 | Yabuuchi et al. | |
| 2017/0264782 A1 | 9/2017 | Hashimoto | |
| 2018/0040109 A1 | 2/2018 | Hayashi et al. | |
| 2018/0069996 A1 | 3/2018 | Shukla et al. | |
| 2018/0139345 A1 | 5/2018 | Goh et al. | |

FOREIGN PATENT DOCUMENTS

| | | |
|---|---|---|
| CN | 103971351 A | 8/2014 |
| CN | 105144688 A | 12/2015 |
| CN | 107534727 A | 1/2018 |
| JP | 2002-057848 | 2/2002 |
| JP | 2003-162715 A | 6/2003 |
| JP | 2007-329749 | 12/2007 |
| JP | 2018-060392 | 4/2018 |
| WO | WO 2016/171090 A1 | 10/2016 |
| WO | WO 2017/222021 A1 | 12/2017 |
| WO | 2018/048231 A1 | 3/2018 |

OTHER PUBLICATIONS

Office Action issued in corresponding Chinese Application No. 201910623776.1 dated Mar. 19, 2021, (10 pages).

\* cited by examiner

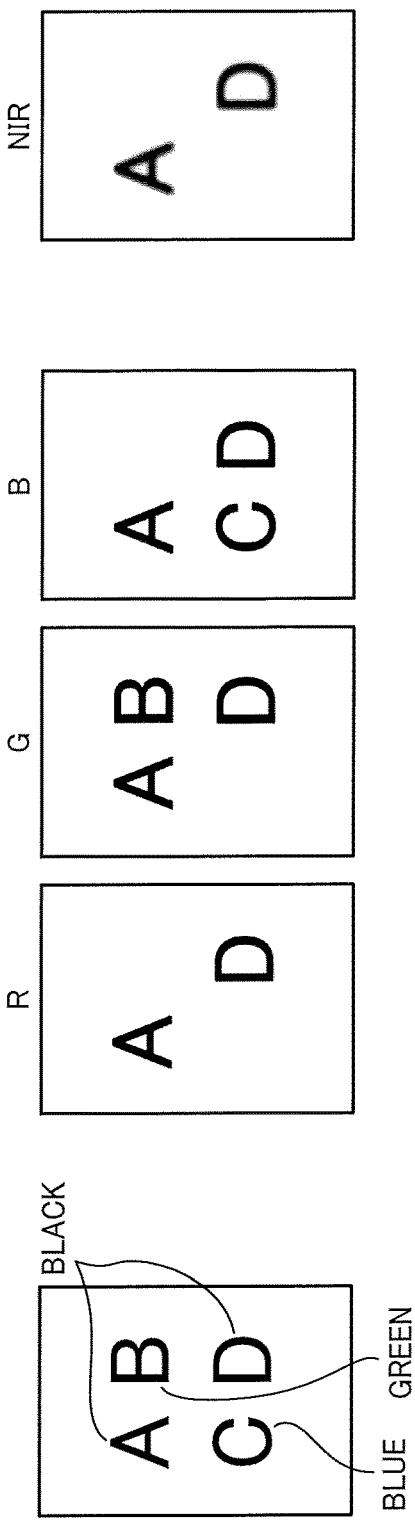
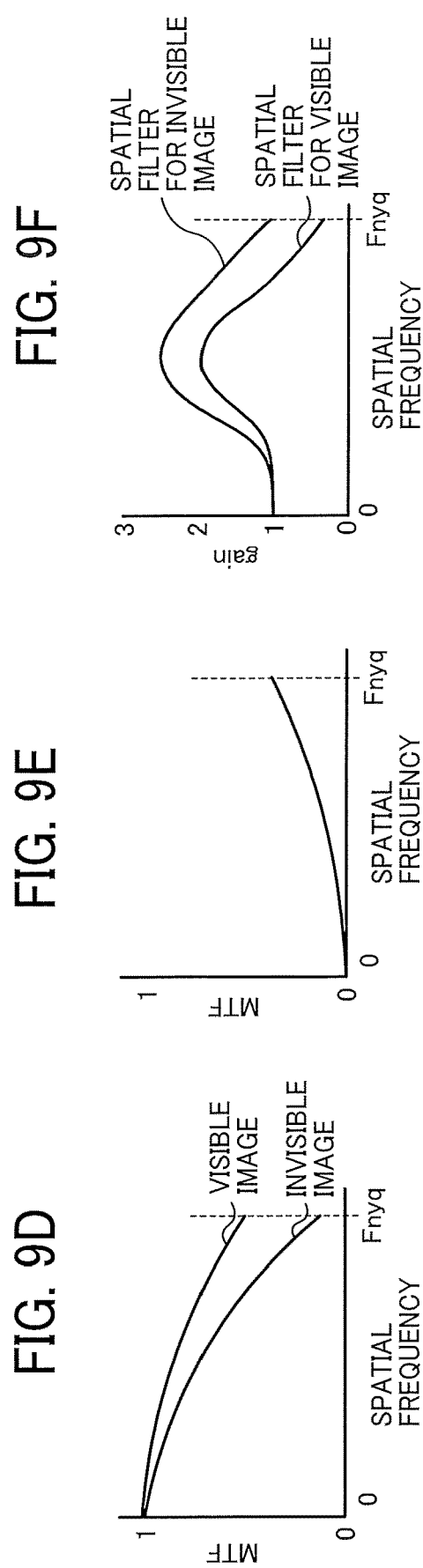
FIG. 9A  FIG. 9B  FIG. 9C
FIG. 9D  FIG. 9E  FIG. 9F

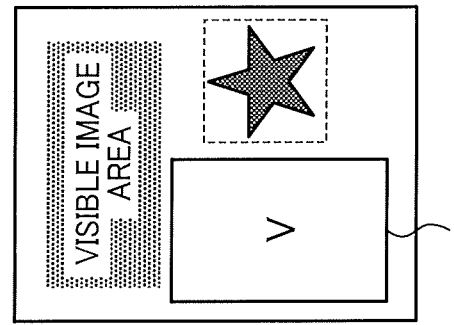
FIG. 19A
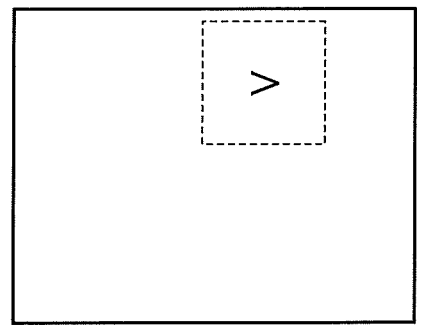
FIG. 19B
FIG. 19C
FIG. 19D
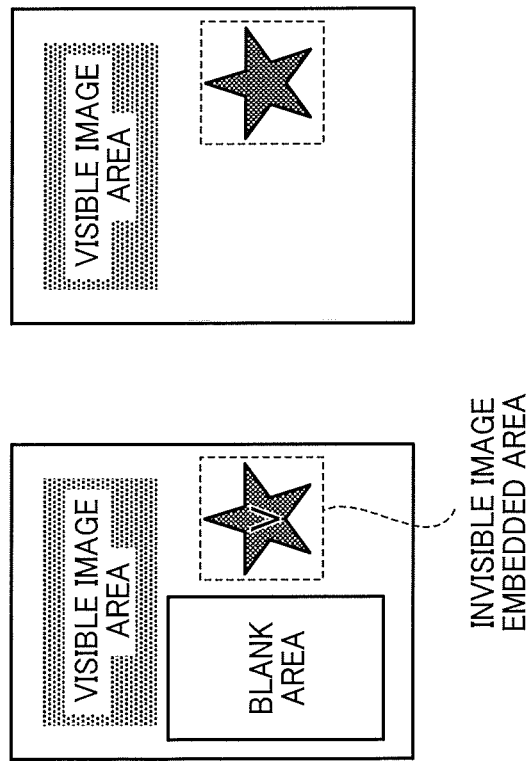

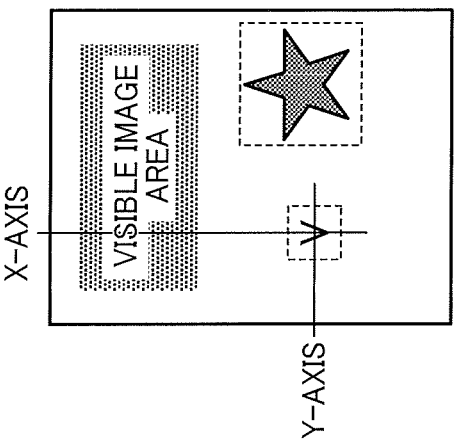
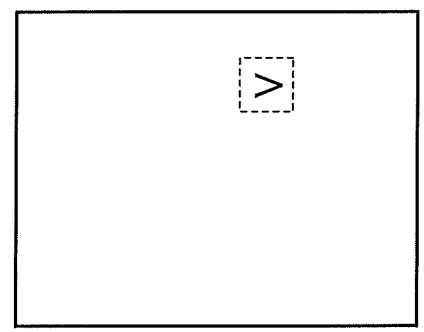
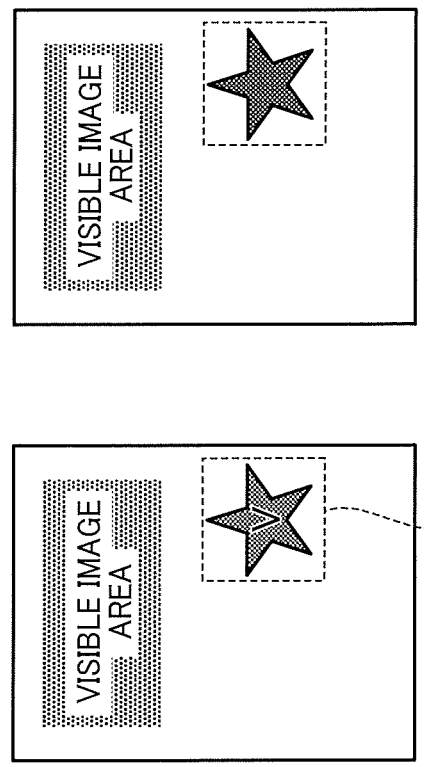

IMAGE PROCESSING APPARATUS, IMAGE PROCESSING SYSTEM, IMAGE PROCESSING METHOD, AND NON-TRANSITORY COMPUTER-READABLE STORAGE MEDIUM

CROSS-REFERENCE TO RELATED APPLICATION

This patent application is based on and claims priority pursuant to 35 U.S.C. § 119(a) to Japanese Patent Application No. 2018-152125, filed on Aug. 10, 2018, in the Japan Patent Office, the entire disclosure of which is hereby incorporated by reference herein.

BACKGROUND

Technical Field

Embodiments of the present disclosure relate to an image processing apparatus, an image processing system, an image processing method, and a non-transitory computer-readable storage medium.

Related Art

In recent years, there has been known a technique for determining the authenticity of a document by reading, with invisible light, invisible information embedded in the document for the purpose of document security.

SUMMARY

In one embodiment of the present disclosure, a novel image processing apparatus includes a sensor and circuitry. The sensor is configured to read a visible spectrum and an invisible spectrum of an image. The circuitry is configured to separate the image read into a visible image and an invisible image and perform different image correction processes on the visible image and the invisible image, respectively.

Also described are novel image forming system, image processing method, and non-transitory, computer-readable storage medium storing computer-readable program code that causes a computer to perform the image processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 9A is a diagram illustrating an input document;

FIG. 9B is a diagram illustrating RGB images of the input document acquired by visible image reading;

FIG. 9C is a diagram illustrating a NIR image of the input document acquired by invisible image reading;

FIG. 9D is a graph illustrating modulation transfer function (MTF) characteristics of visible and invisible images;

FIG. 9E is a graph illustrating an MTF characteristic difference between the visible and invisible images;

FIG. 9F is a graph illustrating frequency characteristics of spatial filters according to the MTF characteristic difference;

FIG. 19A is a diagram illustrating an input document image;

FIG. 19B is a diagram illustrating a visible image of the input document acquired by visible image reading;

FIG. 19C is a diagram illustrating an invisible image of the input document acquired by invisible image reading;

FIG. 19D is a diagram illustrating a blank-area synthesized image;

FIG. 22A is a diagram illustrating an input document;

FIG. 22B is a diagram illustrating a visible image of the input document acquired by visible image reading;

FIG. 22C is a diagram illustrating an invisible image of the input document acquired by invisible image reading; and FIG. 22D is a diagram illustrating a position-designated synthesized image.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
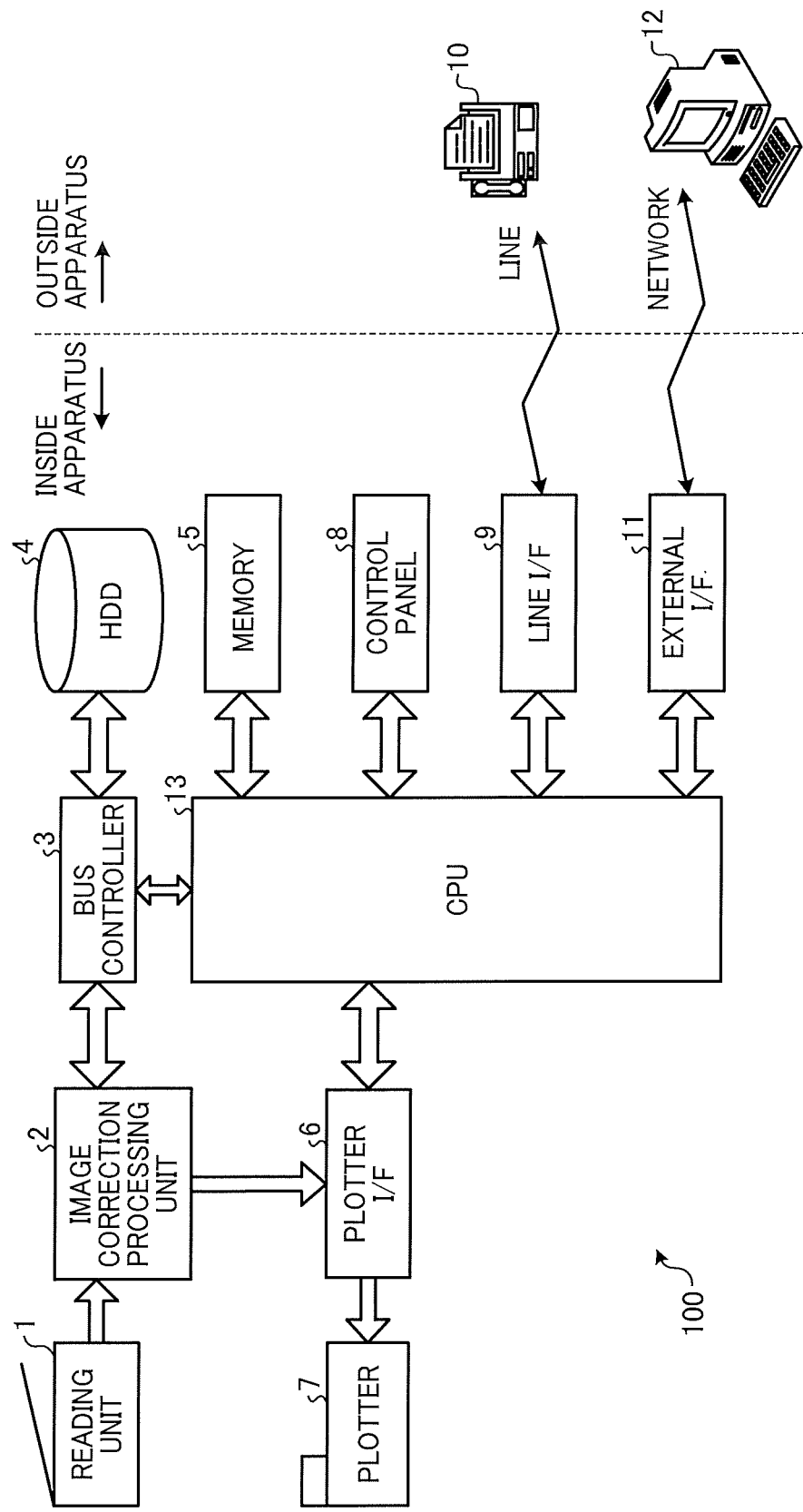
FIG. 1 is a block diagram illustrating a system configuration of an image processing apparatus according to a first embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

Now, a description is given of a first embodiment of the present disclosure.

FIG. 1 is a block diagram illustrating a system configuration of an image processing apparatus 100 according to the first embodiment.

The image processing apparatus 100 according to the present embodiment is an image forming system generally called a multifunction peripheral, printer, or product (MFP) having at least two of copying, printing, scanning, and facsimile functions.

An image processing apparatus 100 illustrated in FIG. 1 includes a reading unit 1 serving as an image reading device, an image correction processing unit 2, a bus controller 3, a hard disk drive (HDD) 4, a central processing unit (CPU) 13, a memory 5, a plotter 7 serving as an image forming device, a plotter interface (I/F) 6, a control panel 8, a line I/F 9, an external I/F 11.

Figure 5:
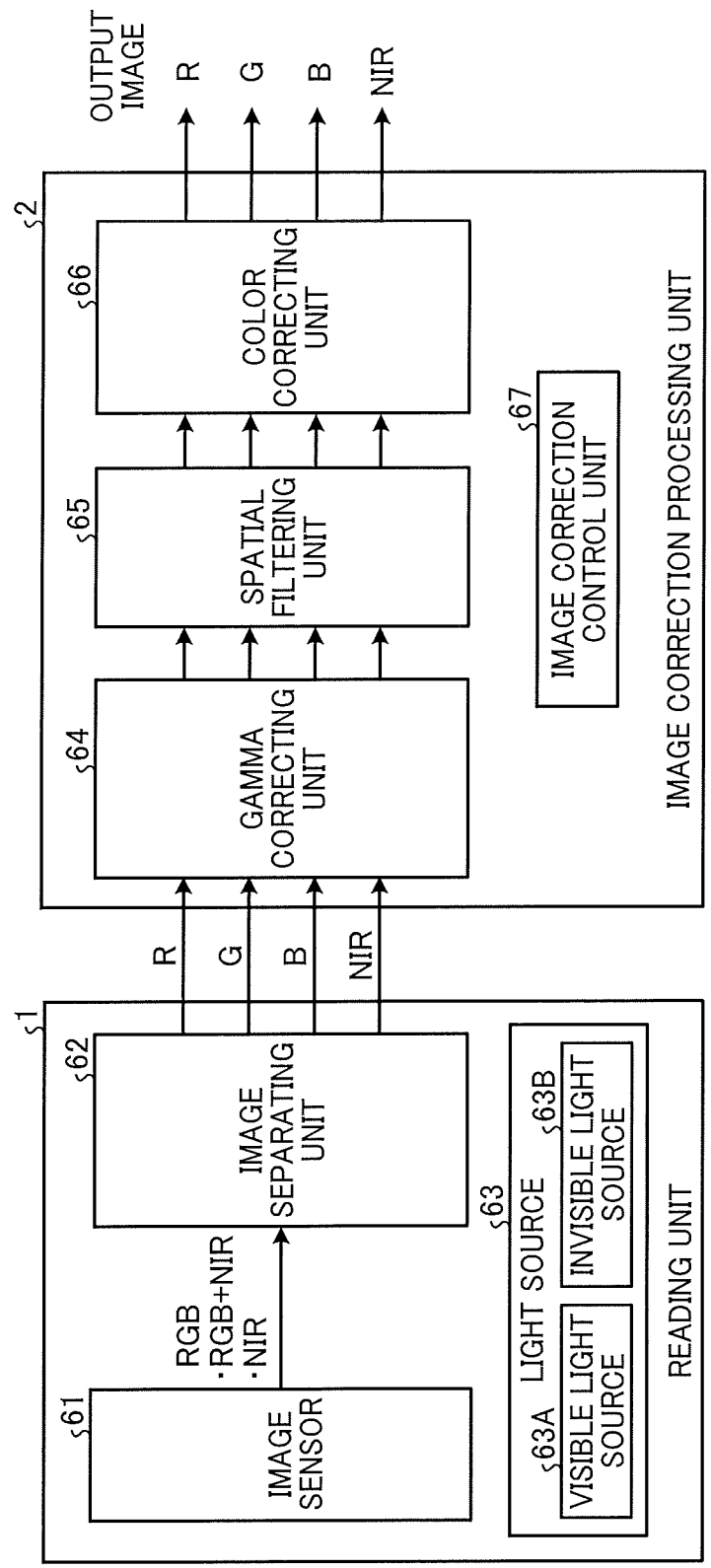
FIG. 5 is a block diagram illustrating a configuration of the reading unit and an image correction processing unit in the image processing apparatus.

The reading unit 1 includes an image sensor (or line sensor) 61 and a light source 63 as illustrated in FIG. 5. The reading unit 1 further includes an analog-to-digital (A/D) converter and drive circuits that drive the image sensor 61, the light source 63, and the A/D converter. The reading unit 1 scans a document placed and acquires the density information of the document. From the density information, the reading unit 1 generates and outputs 8-bit red, green, and blue (RGB) digital image data of 600 dots per inch (dpi). The reading unit 1 uses a xenon lamp or a light emitting diode (LED) as the light source 63.

The image correction processing unit 2 processes the digital image data output from the reading unit 1. Then, the image correction processing unit 2 outputs the image data thus processed. A detailed description thereof is deferred.

The bus controller 3 controls a data bus that exchanges various kinds of data such as image data and control commands in the image processing apparatus 100. The bus controller 3 also functions as a bridge between a plurality of bus standards. In the present embodiment, the bus controller 3, as an application specific integrated circuit (ASIC), is connected to each of the image correction processing unit 2 and the CPU 13 via a peripheral component interconnect express (PCI-Express) bus while being connected to the HDD 4 via an advanced technology attachment (ATA) bus.

The HDD 4 is a large-sized storage device, as used in, e.g., a personal computer, for storing electronic data. In the image processing apparatus 100, the HDD 4 mainly stores digital image data and associated information of the digital image data (e.g., setting mode).

In the present embodiment, the HDD 4 is connected to the bus controller 3 through ATA bus connection standardized by extending integrated drive electronics (IDE).

The CPU 13 is a microprocessor that generally controls the image processing apparatus 100. In the present embodiment, the CPU 13 is a recently widespread integrated CPU having a single CPU core with additional functions. Specifically, in the present embodiment, the CPU 13 is an integrated CPU having a connecting function with a general-purpose standard IN and a bus connecting function using a crossbar switch.

The memory 5 is a volatile memory that stores temporarily exchanged data so as to absorb, e.g., a speed difference in connecting a plurality of bus standards and a processing speed difference of a connected component. In addition, the memory 5 temporarily stores, e.g., programs and intermediate processing data when the CPU 13 controls the image processing apparatus 100. In the present embodiment, the memory 5 is a dual inline memory module (DIMM). The DIMM is used in standardized personal computers.

In response to cyan, magenta, yellow, and black (CMYK) digital image data, the plotter 7 outputs an image on a recording medium according to the CMYK digital image data, through an electrophotographic process using a laser beam or with an inkjet.

In response to the CMYK digital image data transmitted via the general-purpose standard I/F as an integrated part of the CPU 13, the plotter I/F 6 performs bus bridging for outputting the CMYK digital image data to an I/F dedicated to the plotter 7. The PCI-Express bus is the general-purpose standard I/F used in the present embodiment.

The control panel 8 is an interface between the image processing apparatus 100 and, e.g., users. The control panel 8 includes, e.g., a liquid crystal display (LCD) provided with a touch panel, and a key group including various processing mode setting keys, numeric keys, and a start key. The control panel 8 displays, on the LCD, various statuses and operating instructions of the image processing apparatus 100. The control panel 8 also detects inputs from the users via the touch panel and the key switch group. In the present embodiment, the control panel 8 is connected to the CPU 13 via the PCI-Express bus.

The line I/F 9 connects the PCI-Express bus and a telephone line. The line I/F 9 enables the image processing apparatus 100 to exchange various kinds of data with a facsimile machine 10, which is an image output device (or image processor), via the telephone line. The facsimile machine 10 is a general facsimile machine that exchanges image data with the image processing apparatus 100 via the telephone line.

The external I/F 11 connects the PCI-Express bus and a computer 12, such as a personal computer, as an image output device (or image processor). The external I/F 11 enables the image processing apparatus 100 to exchange various kinds of data with the computer 12. In the present embodiment, the external I/F is connected to the computer 12 via a network such as Ethernet (registered trademark). That is, the image processing apparatus 100 is connected to the network via the external I/F 11. Note that the computer 12 transmits various instructions and exchanges image data with the image processing apparatus 100 via application software and drivers installed in the computer 12.

Figure 2:
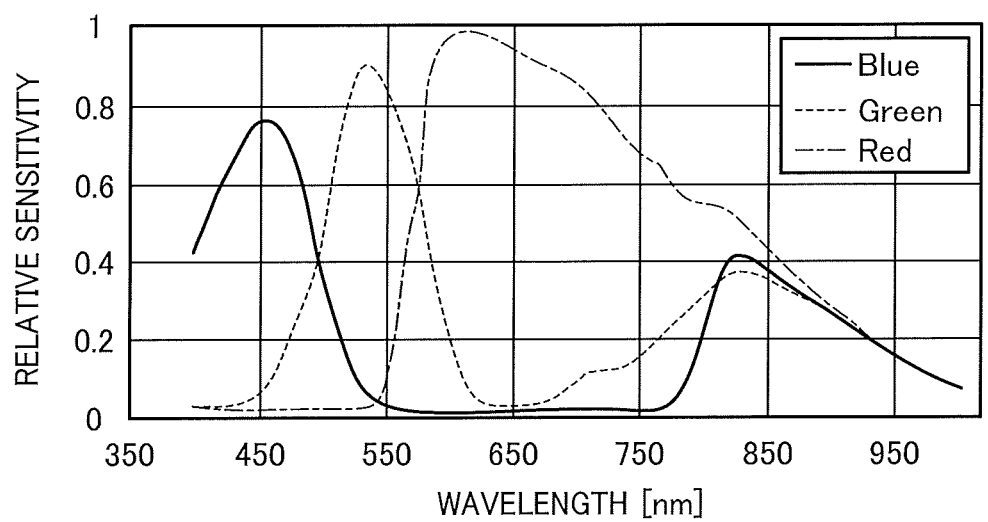
FIG. 2 is a graph illustrating spectral sensitivity characteristics of an image sensor of a reading unit included in the image processing apparatus.

Referring now to FIG. 2, a description is given of reading of a visible image by the reading unit 1.

FIG. 2 is a graph illustrating spectral sensitivity characteristics of the image sensor 61 of the reading unit 1 described above.

As illustrated in FIG. 2, the image sensor 61, provided with a color filter, of the reading unit 1 has a sensitivity to a visible spectrum such as RGB and to an invisible spectrum not less than about 750 nm.

Figure 3:
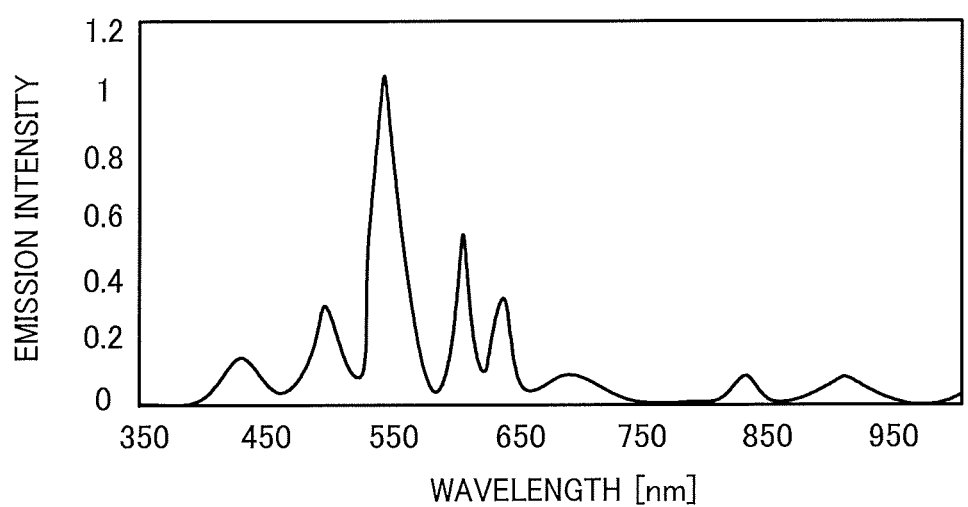
FIG. 3 is a graph illustrating a spectrum of a light source of the reading unit.

FIG. 3 is a graph illustrating a spectrum of the light source 63 of the reading unit 1.

In the present example, FIG. 3 illustrates a spectrum of a xenon lamp. As illustrated in FIG. 3, the xenon lamp has a weak spectral intensity in a near-infrared (NIR) spectrum, which is an invisible spectrum.

That is, a visible image read by the reading unit 1 with the image sensor 61 and the light source 63 is an image subjected to visible light together with NIR light.

Referring now to FIGS. 4A to 4D, a description is given of difficulties that the typical techniques face in reading a visible image as described above.

Figure 4A:
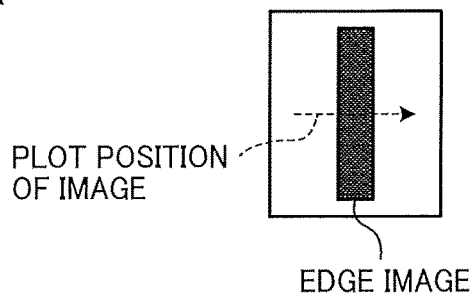
FIG. 4A is a plan view of an edge image.
Figure 4B:
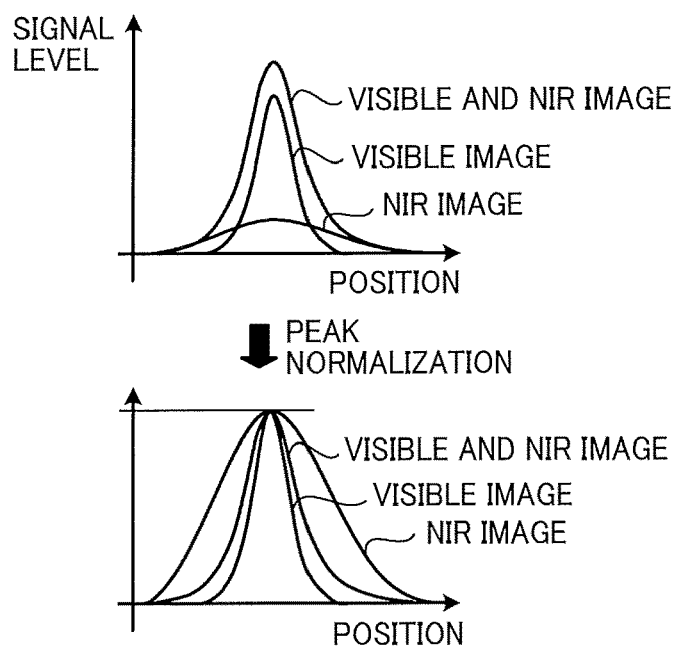
FIG. 4B is a graph-based diagram illustrating relationships between a signal level and a position.
Figure 4C:
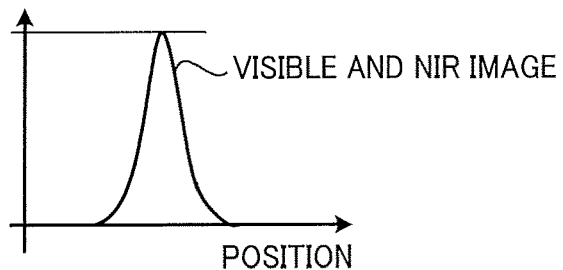
FIG. 4C is a graph illustrating the relationship between the signal level and the position after image correction.
Figure 4D:
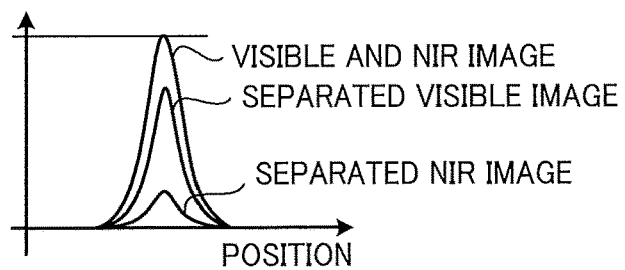
FIG. 4D is a graph illustrating the relationship between the signal level and the position after image separation.

FIG. 4A is a plan view of an edge image. FIG. 4B is a graph-based diagram illustrating relationships between a signal level and a position. FIG. 4C is a graph illustrating the relationship between the signal level and the position after image correction. FIG. 4D is a graph illustrating the relationship between the signal level and the position after image separation.

Specifically, FIGS. 4B and 4D illustrate intensity images of visible and invisible signal components when the edge image illustrated in FIG. 4A is read. In short, FIGS. 4B and 4D illustrate signal level images.

The reading unit 1 includes a lens that is designed optimally for reading a visible image while keeping the image quality. Signal levels of readings from the reading unit 1 depend on the wavelength due to the light amount of the light source 63 and the spectral sensitivity characteristics of the image sensor 61. Compared to the visible signal level, the NIR signal level stays low. In addition, an upper graph of FIG. 4B illustrates a great difference between the visible signal level and the NIR signal level.

That is, as illustrated in FIG. 4B, a visible image, a NIR image, and a composite or synthesis image constructed of visible and NIR images (hereinafter referred to as a visible and NIR image) exhibit different signal characteristics from each other.

FIGS. 4C and 4D illustrate a typical case in which a composite or synthesis image is optimized and then separated into images.

Specifically, FIG. 4C illustrates a signal characteristic of the visible and NIR image subjected to image correction, such as modulation transfer function (MTF) correction. In other words, FIG. 4C illustrates the signal characteristic of the visible and NIR image corrected to be equivalent to a visible image.

As illustrated in FIG. 4C, the visible and NIR image corrected with an optimum parameter exhibits a given MTF characteristic. However, as illustrated in FIG. 4D, when the composite image corrected as illustrated in FIG. 4C is separated into the visible image and the NIR image, the separated NIR image keeps in a low signal level. That is, the NIR signal component fails to achieve a target MTF characteristic. In short, a typical optimization of a composite image does not achieve an optimum correction of a single image after image separation.

In the image processing apparatus 100 according to the present embodiment, the reading unit 1 reads a visible image in a general document scanning, which is a main operation of the reading unit 1. On the other hand, the reading unit 1 reads an invisible image in an authenticity determination scanning. Since visible and invisible images have different kinds of information, the visible and invisible images may be used separately, rather than as a composite image.

To address such a situation, according to the present embodiment, the image processing apparatus 100 separates the visible and NIR images from each other, and then corrects the visible and NIR images thus separated. Note that separating a composite image into a single visible image and a single invisible image is defined as image separation.

The present embodiment describes and illustrates the NIR image as an invisible image. Alternatively, the invisible image may be an ultraviolet image.

FIG. 5 is a block diagram illustrating a configuration of the reading unit 1 and the image correction processing unit 2 in the image processing apparatus 100.

As illustrated in FIG. 5, the reading unit 1 includes an image separating unit 62 in addition to the image sensor 61 and the light source 63 described above. The image sensor 61 is a charge-coupled device (CCD) photovoltaic device. As described above, the light source 63 is a xenon lamp or an LED.

The image correction processing unit 2 includes a gamma correcting unit 64, a spatial filtering unit 65, a color correcting unit 66, and an image correction control unit 67.

The gamma correcting unit 64 converts a gamma (γ) characteristic of RGB image data received from the reading unit 1 into a predetermined characteristic (e.g., ½.2^).

The spatial filtering unit 65 corrects the MTF characteristic of the reading unit 1 and converts a frequency characteristic of read image to prevent moire, thereby clarifying and smoothing images. The spatial filtering unit 65 unifies the sharpness of the RGB image data into a predetermined characteristic. For example, when a reference chart is scanned, the spatial filtering unit 65 converts lines per inch (lpi) to be a predetermined MTF characteristic value for each given image quality mode.

The color correcting unit 66 unifies the colors of RGB image data into RGB image data values of a predetermined characteristic, such as standard Red Green Blue (sRGB) and optional Red Green Blue (opRGB). In the present embodiment, the color correcting unit 66 converts the color space to be the standard color space, for example. Note that the present embodiment employs a three-dimensional lookup method as a color converting method.

The image correction control unit 67 sets process parameters for the gamma correcting unit 64, the spatial filtering unit 65, and the color correcting unit 66.

The image correction control unit 67 includes a controller such as a CPU and storage devices such as a read only memory (ROM) and a random access memory (RAM). Thus, the image correction control unit 67 has a hardware configuration using a general computer. The CPU operating according to programs stored in the storage devices causes the image correction control unit 67 to execute various processes.

The programs executed by the image correction control unit 67 is recorded on or stored in a computer-readable recording or storage medium, such as a compact disc read-only memory (CD-ROM), a flexible disk (FD), a compact disc-recordable (CD-R), or a digital versatile disk (DVD), in an installable or executable format file. Thus, the programs are providable.

Alternatively, the programs executed by the image correction control unit 67 may be stored in a computer connected to a network such as the Internet and downloaded via the network, thus being providable. Alternatively, the programs executed by the image correction control unit 67 may be provided or distributed via a network such as the Internet. Alternatively, the programs executed by the image correction control unit 67 may be incorporated into, e.g., a ROM, in advance, thus being providable.

Note that the image correction control unit 67 may be implemented by hardware such as an integrated circuit (IC).

Image data having characteristics unified by the color correcting unit 66 and the gamma correcting unit 64 that correct the scanner characteristics of the reading unit 1 basically is stored inside the image processing apparatus 100. The image data stored inside the image processing apparatus 100 is converted into image signals suitable for the characteristics of an output destination when the image data is reused thereafter.

With continued reference to FIG. 5, a description is given of the image separation performed before the image correction. As illustrated in FIG. 5, the reading unit 1 irradiates a document with light from the light source 63. The reading unit 1 reads the reflected light from the document with the image sensor 61. Thus, the reading unit 1 reads an image of the document. A signal indicating the image thus read is input into the image separating unit 62. In response to the signal, the image separating unit 62 separates the image into visible and NIR images. The separated image data is input into the image correction processing unit 2.

As illustrated in FIG. 5, the image separating unit 62 prepares three RGB channels and a NIR-dedicated channel. Thus, the present embodiment enables simultaneous processing by use of different channels, that is, visible RGB channels and NIR-dedicated channel.

In the image correction processing unit 2, the gamma correcting unit 64, the spatial filtering unit 65, and the color correcting unit 66 process the separated images or image signals input from the image separating unit 62. Specifically, in the image correction processing unit 2, for example, the gamma correcting unit 64 changes the background removal correction intensities. The spatial filtering unit 65 changes the MTF correction intensities. The color correcting unit 66 changes the color conversion coefficients.

Further, with the process parameters set by the image correction control unit 67, the image correction processing unit 2 corrects the separated images with different intensities according to the image type. That is, when correcting a visible image, the image correction processing unit 2 performs an image correction process suitable for the visible image. On the other hand, when correcting a NIR image, the image correction processing unit 2 performs an image correction process suitable for the NIR image.

Figure 6:
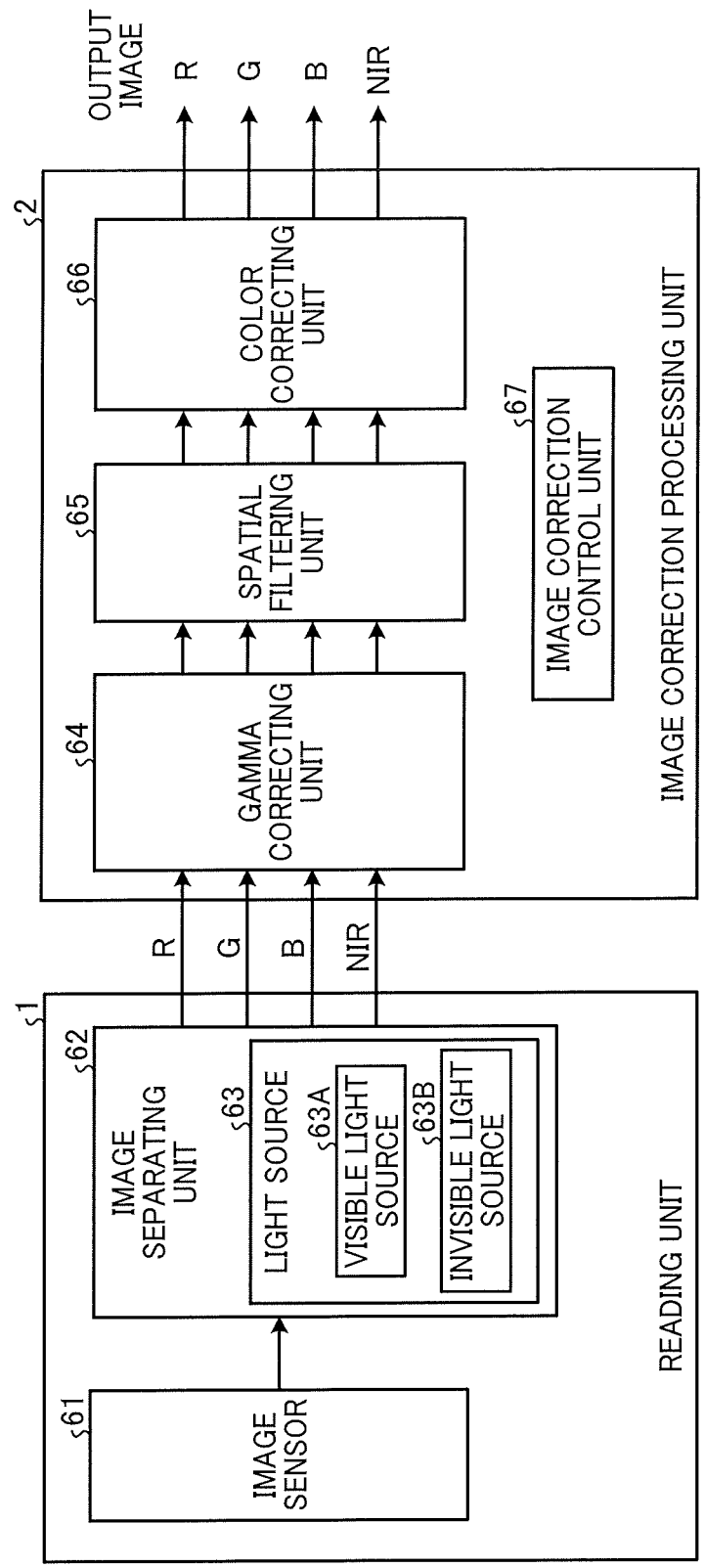
FIG. 6 is a block diagram illustrating a way of image separation.

FIG. 6 is a block diagram illustrating a way of the image separation.

As illustrated in FIG. 6, the image separating unit 62 includes the light source 63.

The image separating unit 62 controls the light source 63 that emits light upon scanning, thereby performing the image separation. Specifically, the light source 63 includes a visible light source 63A and an invisible light source 63B.

Figure 7A:
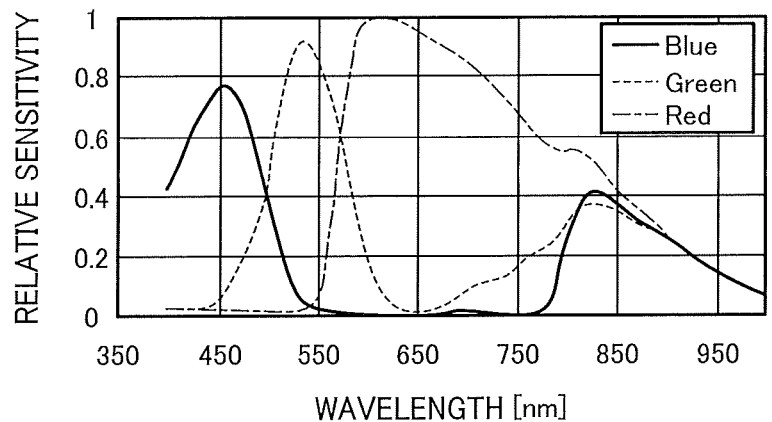
FIG. 7A is a graph illustrating spectral sensitivity characteristics of the image sensor.
Figure 7B:
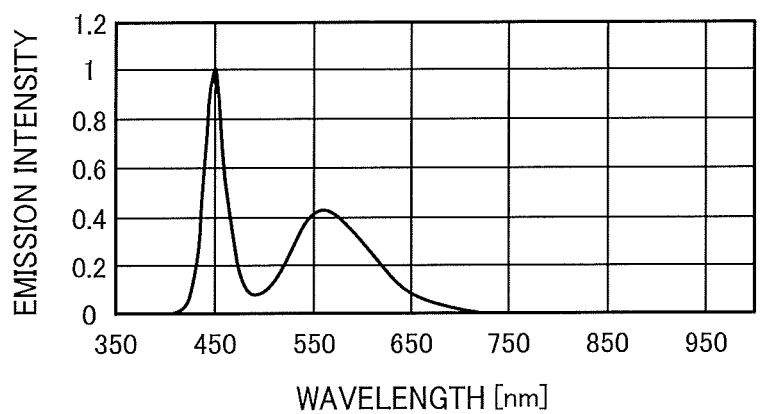
FIG. 7B is a graph illustrating a relationship between an emission intensity of a visible light source and a wavelength.
Figure 7C:
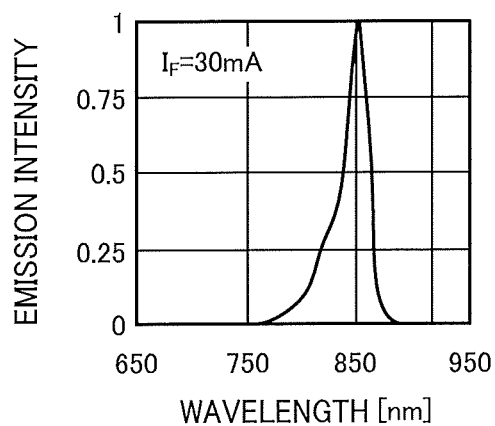
FIG. 7C is a graph illustrating a relationship between an emission intensity of an invisible light source and the wavelength.

FIGS. 7A to 7C illustrate conditions of the visible light source 63A and the invisible light source 63B switched therebetween upon the image separation.

Specifically, FIG. 7A is a graph illustrating spectral sensitivity characteristics of the image sensor 61. As described above with reference to FIG. 2, the image sensor 61 of the reading unit 1 has a sensitivity to a visible spectrum such as RGB and to a NIR spectrum not less than about 750 nm.

FIG. 7B is a graph illustrating a relationship between an emission intensity of the visible light source 63A and a wavelength. FIG. 7C is a graph illustrating a relationship between an emission intensity of the invisible light source 63B and the wavelength.

The visible light source 63A of the light source 63 is a light source that does not have an emission intensity in the NIR spectrum not less than about 750 nm. On the other hand, the invisible light source 63B of the light source 63 is a light source that has an emission intensity in a spectrum of from about 750 nm to about 1000 nm. With such a configuration, the image separating unit 62 emits light with the visible light source 63A of the light source 63 upon a scanning operation. Upon another scanning operation, the image separating unit 62 emits light with the invisible light source 63B of the light source 63. Thus, the image separating unit 62 outputs visible and NIR images as output images.

Note that, to acquire both the visible image and the NIR image, the reading unit 1 scans the image twice by switching between the visible light source 63A and the invisible light source 63B. Alternatively, the reading unit 1 may scan the image once while sequentially switching between and turning on the visible light source 63A and the invisible light source 63B, thereby acquiring the visible and invisible images at one time.

The image correction processing unit 2 corrects the images thus acquired. In the image correction processing unit 2, the image correction control unit 67 changes process parameters according to the image type (i.e., visible image or invisible image) or a user mode. Accordingly, the image correction processing unit 2 performs an optimal image correction for each mode and image type.

Figure 8:
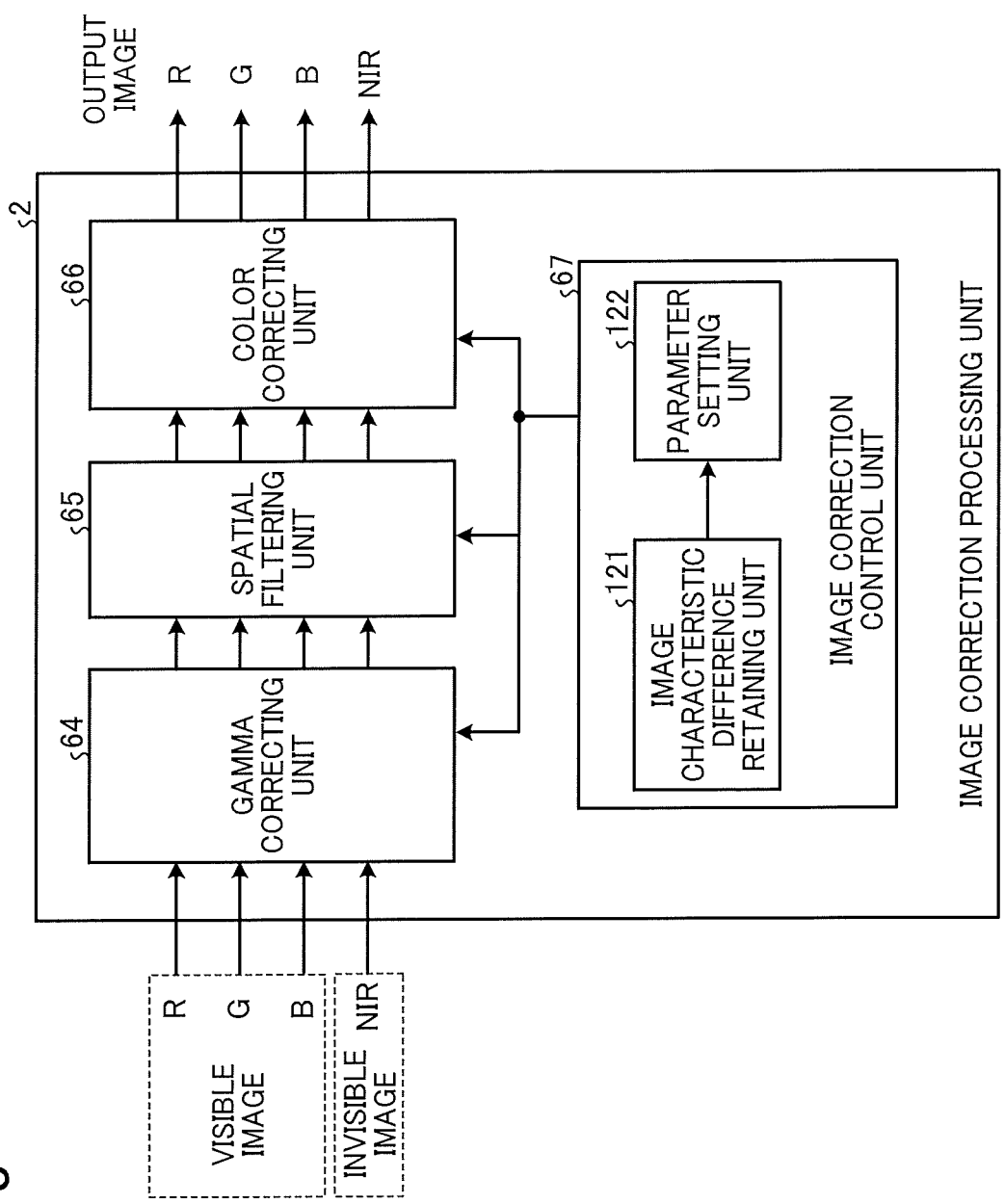
FIG. 8 is a block diagram illustrating a configuration of the image correction processing unit.

Referring now to FIG. 8, a description is given of control executed by the image correction control unit 67.

FIG. 8 is a block diagram illustrating a configuration of the image correction processing unit 2.

Specifically, FIG. 8 illustrates an image correcting process performed by the image correction control unit 67 to match the image characteristics.

The image correction control unit 67 corrects visible and invisible images to match an image characteristic of the visible image and an image characteristic of the invisible image. In other words, the visible and invisible images corrected exhibit identical image characteristics. Specifically, the image correction control unit 67 sets process parameters corresponding to the image characteristics of the visible and invisible images so as to match the image characteristics of the visible and invisible images, thus correcting the visible and invisible images. The image qualities matched as described above enable users to equally handle the visible and invisible image outputs.

As illustrated in FIG. 8, the image correction control unit 67 includes an image characteristic difference retaining unit 121 and a parameter setting unit 122 to match the image characteristics. Specifically, the image characteristic difference retaining unit 121 retains an image characteristic difference between the visible and invisible images, that is, a difference between the image characteristic of the visible image and the image characteristic of the invisible image. The parameter setting unit 122 sets parameters for the gamma correcting unit 64 and the like. The image correction control unit 67 sets parameters for the gamma correcting unit 64, the spatial filtering unit 65, and the color correcting unit 66 according to the image characteristic difference retained by the image characteristic difference retaining unit 121. The image correction control unit 67 sets parameters so as to absorb the image characteristic difference between the visible and invisible images, thereby attaining closer image qualities of the visible and invisible images after image processing.

Now, a description is given of the parameter setting according to the image characteristic difference. In the present embodiment, the spatial filtering unit 65 restores the MTF with an MTF intensity difference between the visible and invisible images, that is, a difference between an MTF intensity of the visible image and an MTF Intensity of the invisible image, thereby equalizing the MTF intensities of the visible and invisible images.

Referring now to FIGS. 9A to 9F, a description is given of determination of an MTF restoration intensity by use of an MTF characteristic.

Initially with reference to FIGS. 9A to 9C, a description is given of an MTF issue in visible image reading and invisible image reading.

FIG. 9A is a diagram illustrating an input document that includes black, green, and blue letters as an image. FIG. 9B is a diagram illustrating RGB images of the input document acquired by visible image reading. FIG. 9C is a diagram illustrating a NIR image of the input document acquired by invisible image reading.

Black letters printed with black ink or black toner generally have a characteristic of absorbing the NIR component. Therefore, as illustrated in FIG. 9C, the black letter printed on the document remains as an image. General scanners that mainly read visible spectrum images are optically designed to be optimized for the visible spectrum. Therefore, unlike the visible spectrum images, invisible spectrum images read by such general scanners are blurred as illustrated in FIG. 9C, compared to the visible spectrum images, due to aberration of the lens.

Referring now to FIGS. 9D to 9F, a description is given of spatial filtering.

The spatial filtering includes edge enhancement and dot smoothing on an input image, thereby correcting the image quality.

A description is now given of MTF correction by acutance improvement.

FIG. 9D is a graph illustrating MTF characteristics of visible and invisible images.

As illustrated in FIG. 9D, the invisible image exhibits an MTF characteristic inferior to the MTF characteristic of the visible image because of a relatively large aberration of the lens. In addition, the degradation of the MTF is greater as the spatial frequency is higher. Note that the MTF is measurable by a general method.

FIG. 9E is a graph illustrating an MTF characteristic difference between the visible and invisible images, that is, a difference between an MTF characteristic of the visible image and an MTF characteristic of the invisible image.

As illustrated in FIG. 9E, the MTF characteristic difference is generated for each spatial frequency.

FIG. 9F is a graph illustrating frequency characteristics of spatial filters according to the MTF characteristic difference.

In the present embodiment, the spatial filtering unit 65 performs filtering such that a spatial filter for the invisible image has a frequency characteristic according to the MTF characteristic difference, with respect to a frequency characteristic of a spatial filter set for the visible image. After the spatial filtering, the MTF characteristics become equivalent between the visible image and the invisible image. The spatial filter for the invisible image has a frequency characteristic to absorb the MTF characteristic difference between the visible and invisible images. Specifically, the spatial filtering unit 65 superimposes data of the MTF characteristic difference on the characteristic of the spatial filter for the visible image, thereby generating the spatial filter. The filter size may limit the filters that can be generated. In such a case, a spatial filter may be generated that absorbs the difference simply at a typical spatial frequency.

With such a configuration, the invisible image, which is blurred greater than the visible image, is corrected simply for the difference in blurring degree of the visible and invisible image. Thus, the invisible image has a quality equal to the visible image.

According to the present embodiment, the image separating unit 62 separates an image into a visible image and an invisible image. Then, the image correction processing unit 2 performs different image correction processes on the visible image and the invisible image, respectively. Accordingly, the invisible image quality is restored to be equivalent to the visible image quality. Thus, the images are providable to users.

In addition, according to the present embodiment, simply selecting an appropriate light source enables the image separation with a simple configuration and a reduced cost.

Further, according to the present embodiment, the visible and invisible images have identical qualities by changing a correction intensity according to the difference between the visible and invisible images.

Note that, in the present embodiment, the image separating unit 62 prepares the NIR-dedicated channel in addition to the three RGB channels. However, the channels are not limited to the RGB channels and the NIR-dedicated channel.

Figure 10:
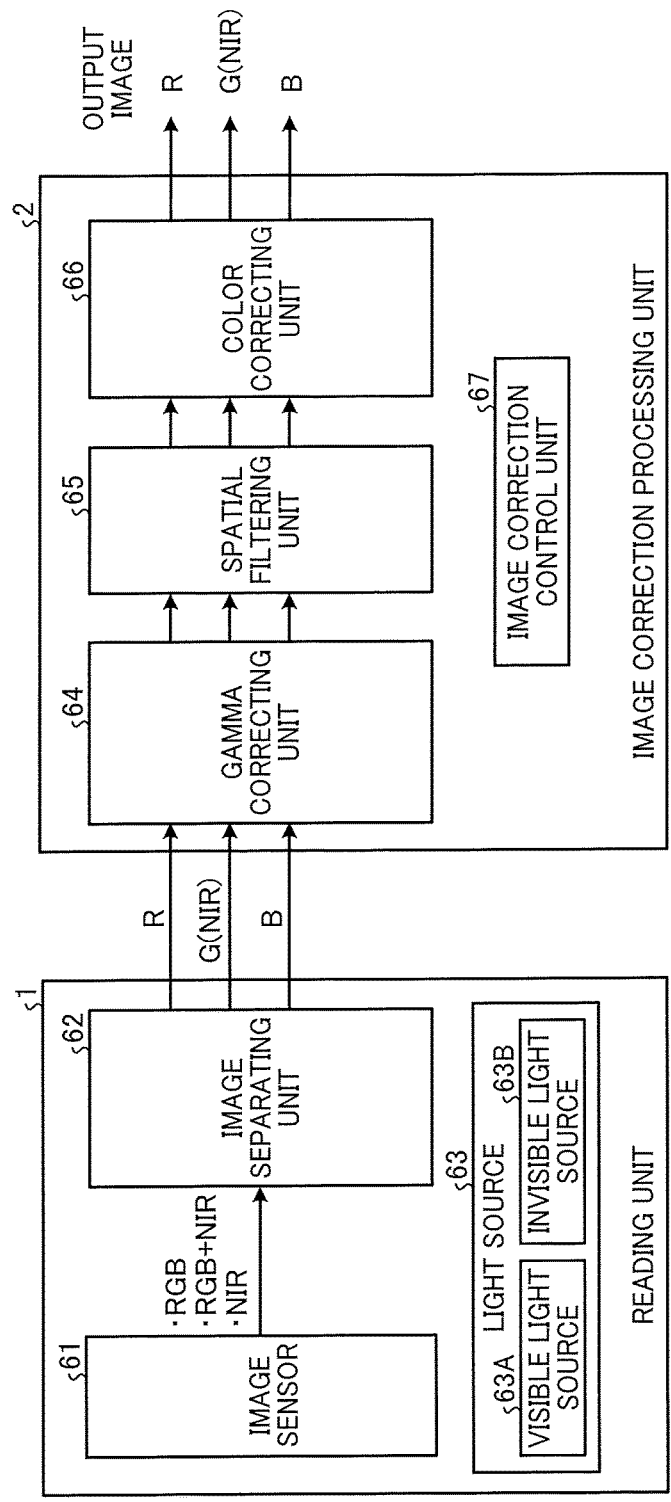
FIG. 10 is a block diagram illustrating a variation of the configuration of the reading unit and the image correction processing unit of FIG. 5.

FIG. 10 is a block diagram illustrating a variation of the configuration of the reading unit 1 and the image correction processing unit 2 of FIG. 5.

As illustrated in FIG. 10, the image separating unit 62 may execute NIR processing by use of the RGB channels as common channels. In the present example of FIG. 10, the image separating unit 62 executes the NIR processing by use of the G channel. Alternatively, the channel for transmission of the NIR data may be the R channel or the B channel. Such use of a visible channel as a common channel to transmit visible and invisible image data prevents an increase in size of the image processing circuit.

The image correction control may be altered according to a mode selected by, e.g., a user.

Figure 11:
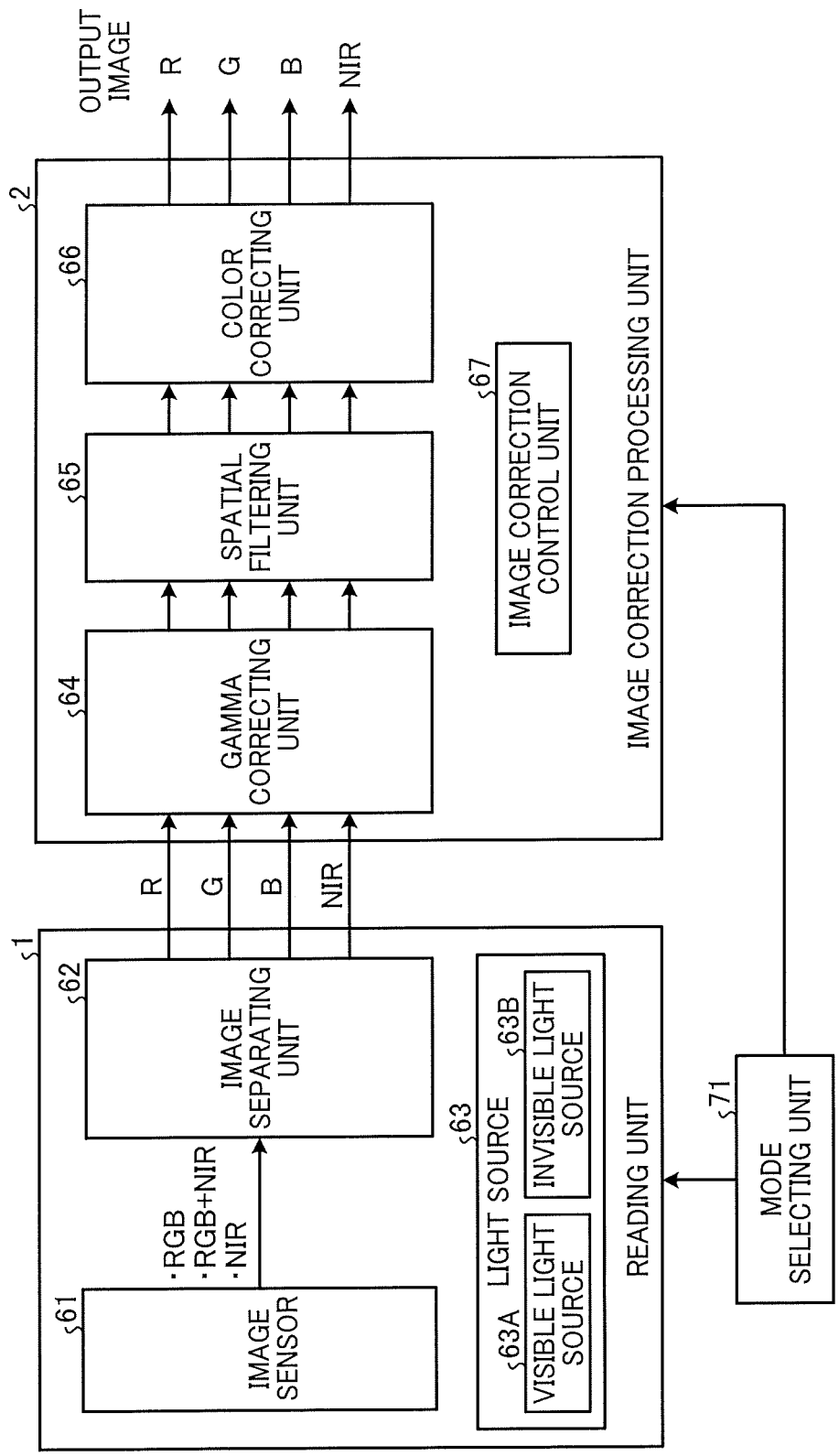
FIG. 11 is a block diagram illustrating another variation of the configuration of the reading unit and the image correction processing unit of FIG. 5.

FIG. 11 is a block diagram illustrating another variation of the configuration of the reading unit 1 and the image correction processing unit 2 of FIG. 5.

As described above with reference to FIG. 4, the reading unit 1 reads a visible image in the general document scanning. On the other hand, the reading unit 1 reads an invisible image in the authenticity determination scanning. In short, the reading unit 1 reads a visible or invisible image depending on the scanning purpose. For example, as described above with reference to FIG. 4B, in a case in which the signals are subjected to peak normalization to maximize the dynamic range, the signal levels of the separated visible and NIR images are different from the signal levels of visible and NIR images read separately. To address such a situation, the image correction control may be altered.

In order to alter the image correction control, for example, the reading unit 1 includes a mode selecting unit 71 as illustrated in FIG. 11. The mode selecting unit 71 has a mode selecting function that allows, e.g., a user to select a mode to acquire a given image. According to the mode selected by the user, the mode selecting unit 71 causes the image sensor 61 to acquire the given image. Meanwhile, the mode selecting unit 71 switches between the process parameters for the image correction processes that are executed after the image separation of the given image acquired.

For example, when the user desires to acquire a visible image alone and selects a visible scan mode, the mode selecting unit 71 turns on the visible light source 63A alone of the light source 63 so that the image sensor 61 acquires the visible image. The image separating unit 62 performs the image separation on the visible image acquired. In the subsequent image correction process, the image correction processing unit 2 corrects the visible image with a parameter A.

By contrast, when the user desires to acquire visible and NIR images and selects a visible/NIR scan mode, the mode selecting unit 71 turns on the visible light source 63A and the invisible light source 63B (in this case, a NIR light source) of the light source 63 so that the image sensor 61 acquires a composite image including the visible (i.e., RGB) image and the NIR image. The image separating unit 62 performs the image separation on the composite image acquired. In the subsequent image correction process, the image correction processing unit 2 corrects the visible image and the NIR image with a parameter B and a parameter B', respectively.

By contrast, when the user desires to acquire a NIR image and selects a NIR scan mode, the mode selecting unit 71 turns on the invisible light source 63B alone of the light source 63 so that the image sensor 61 acquires the NIR image. The image separating unit 62 performs the image separation on the NIR image acquired. In the subsequent image correction process, the image correction processing unit 2 corrects the NIR image with a parameter C'.

Although the image correction processing unit 2 receives the visible and NIR images from the image separating unit 62 like the example described above with reference to FIG. 5, the image correction processing unit 2 of the present variation corrects the visible and NIR images with the process parameters changed by the image correction control unit 67 of the image correction processing unit 2 according to the mode selected by the user.

Figure 12:
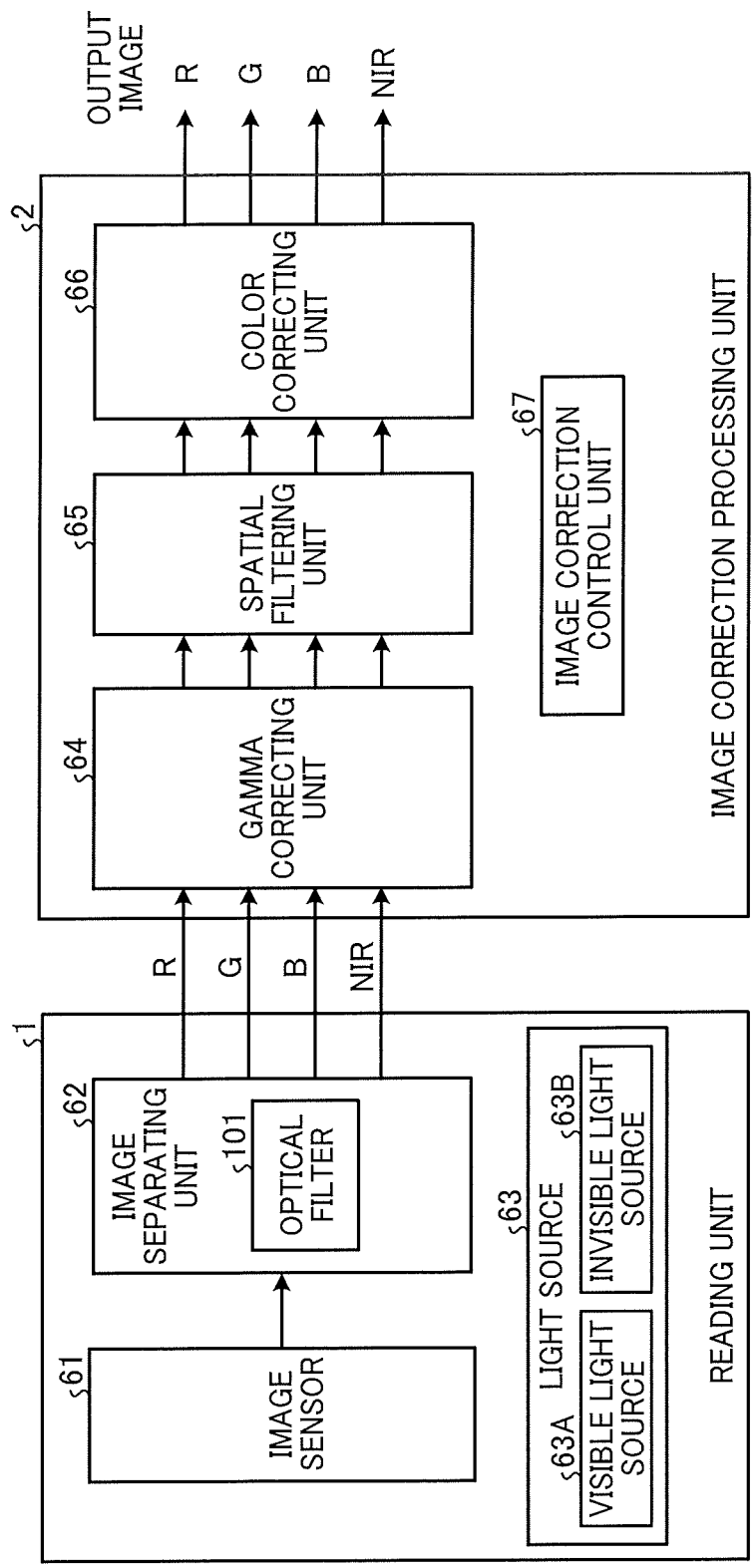
FIG. 12 is a block diagram illustrating a configuration of the reading unit and the image correction processing unit of the image processing apparatus according to a second embodiment of the present disclosure.
Figure 13A:
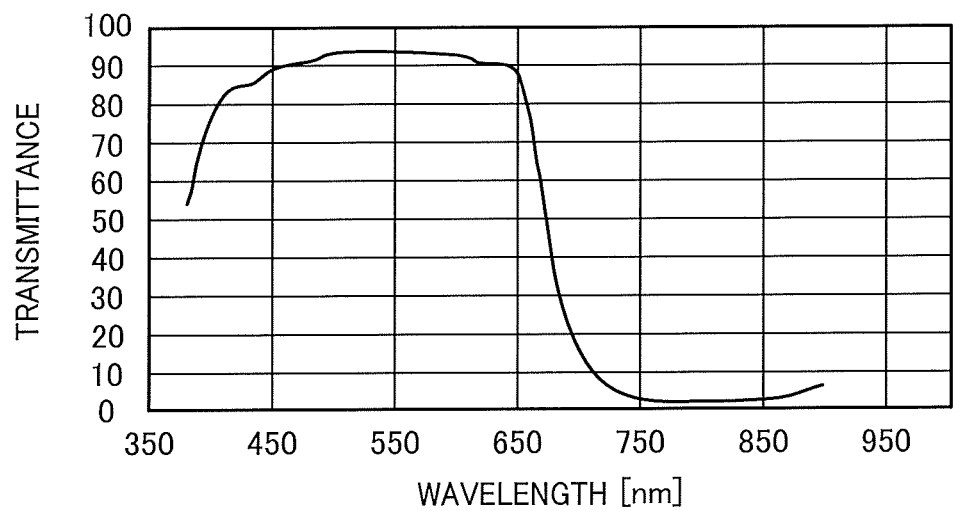
FIG. 13A is a graph illustrating a spectrum of an infrared cut filter.
Figure 13B:
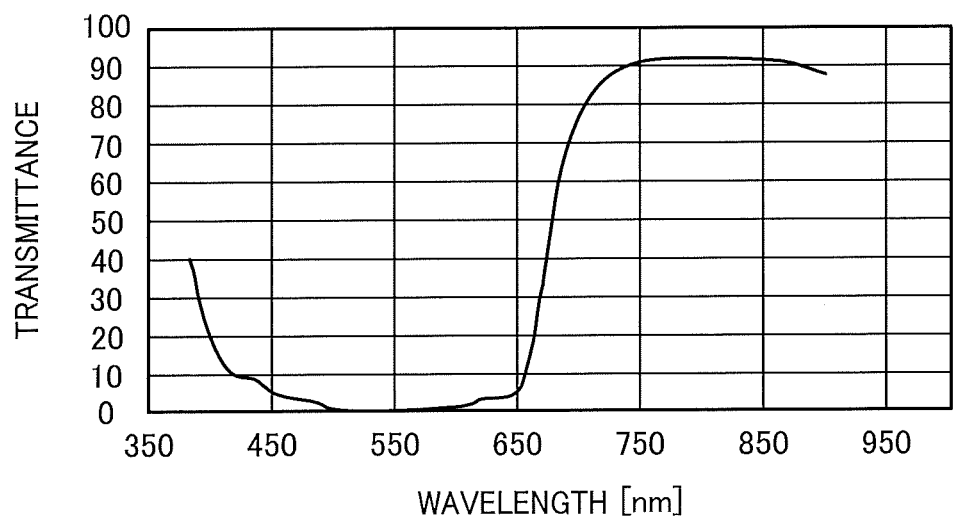
FIG. 13B is a graph illustrating a spectrum of a visible spectrum cut filter.

Referring now to FIGS. 12 to 13B, a description is given of a second embodiment of the present disclosure.

Unlike the image processing apparatus 100 according to the first embodiment, the image processing apparatus 100 according to the second embodiment performs the image separation by use of an optical filter such as a spectrum cut filter. A redundant description of identical features in the first and second embodiments is herein omitted; whereas a description is now given of features of the second embodiment different from the features of the first embodiment.

FIG. 12 is a block diagram illustrating a configuration of the reading unit 1 and the image correction processing unit 2 of the image processing apparatus 100 according to the second embodiment.

As illustrated in FIG. 12, the image separating unit 62 includes an optical filter 101 (e.g., spectrum cut filter) to perform the image separation. Examples of the optical filter 101 include an infrared cut filter and a visible spectrum cut filter.

Each of FIGS. 13A and 13B illustrates a graph of a spectrum of a filter.

Specifically, FIG. 13A is a graph illustrating a spectrum of an infrared cut filter.

Infrared cut filters exhibit a characteristic of cutting an image in the invisible spectrum not less than about 750 nm. The image separating unit 62 causes the infrared cut filter to cut an invisible spectrum image from a visible read image, thereby acquiring an image including a visible spectrum alone.

FIG. 13B is a graph illustrating a spectrum of a visible spectrum cut filter.

Visible spectrum cut filters exhibit a characteristic of cutting an image in the visible spectrum less than about 750 nm. The image separating unit 62 causes the visible spectrum cut filter to cut a visible spectrum image from a NIR read image, thereby acquiring an image including a NIR spectrum alone.

When the image separating unit 62 uses the optical filter 101 as described above, the light source 63 turns on the visible light source 63A and the invisible light source 63B at one time.

Thus, the present embodiment enhances a simple lighting control of the light source 63 according to the mode. The present embodiment also enhances reduction of the user waiting time with image acquisition by a single scan.

Figure 14:
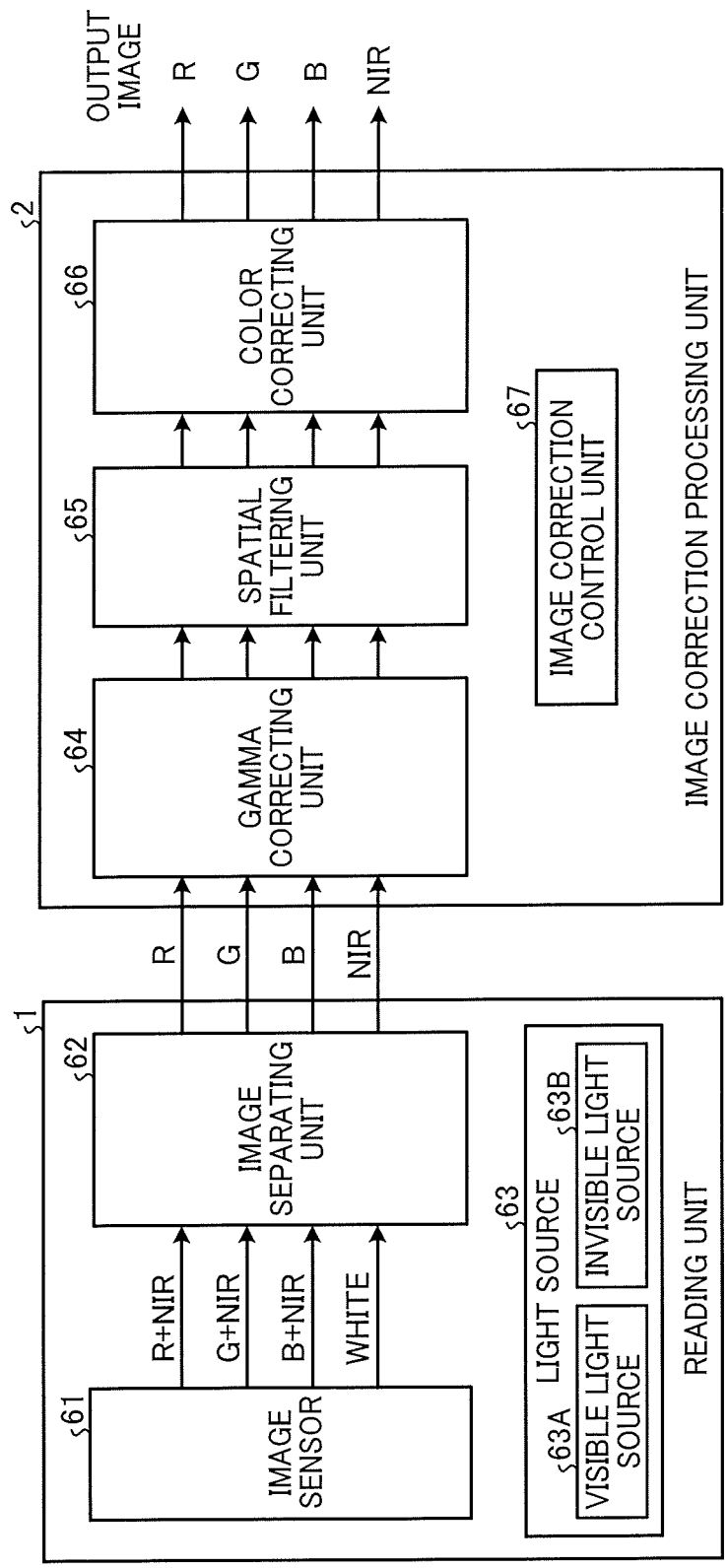
FIG. 14 is a block diagram illustrating a configuration of the reading unit and the image correction processing unit of the image processing apparatus according to a third embodiment of the present disclosure.

Referring now to FIG. 14, a description is given of a third embodiment of the present disclosure.

Unlike the image processing apparatus 100 according to the first embodiment, the image processing apparatus 100 according to the third embodiment performs the image separation by image processing. A redundant description of identical features in the first and third embodiments is herein omitted; whereas a description is now given of features of the third embodiment different from the features of the first embodiment.

FIG. 14 is a block diagram illustrating a configuration of the reading unit 1 and the image correction processing unit 2 of the image processing apparatus 100 according to the third embodiment.

As illustrated in FIG. 14, the reading unit 1 of the image processing apparatus 100 turns on the visible light source 63A and the invisible light source 63B of the light source 63 at one time to irradiate a document with light. The reading unit 1 reads the reflected light from the document with the image sensor 61. Then, visible and NIR signals indicating visible and invisible images read at one time are input into the image separating unit 62 together with a white signal indicating an image read so as to include a full spectrum.

The image separating unit 62 performs, e.g., masking operation by use of the visible and NIR signals and the white signal thus input, thereby separating the signals into RGB signals and a NIR signal.

The image correction processing unit 2 corrects the visible and NW images thus separated by the image separating unit 62.

Note that the image separating unit 62 may be included in the image correction processing unit 2.

Thus, the present embodiment omits the need to provide an optical filter (e.g., spectrum cut filter), thereby reducing costs. In addition, according to the present embodiment, the reading unit 1 turns on the visible light source 63A and the invisible light source 63B of the light source 63 at one time to read an image with a single scan, thereby reducing the user waiting time.

Figure 15:
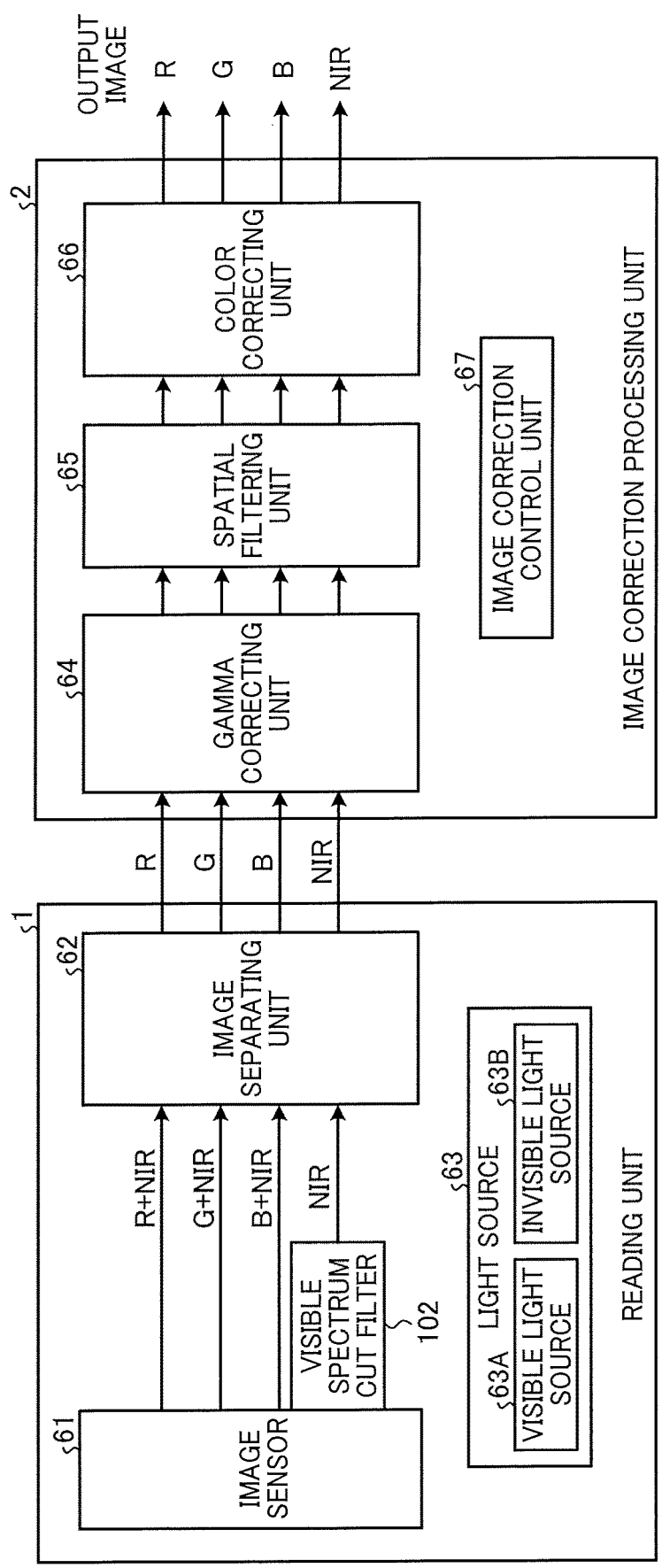
FIG. 15 is a block diagram illustrating a configuration of the reading unit and the image correction processing unit of the image processing apparatus according to a fourth embodiment of the present disclosure.

Referring now to FIG. 15, a description is given of a fourth embodiment of the present disclosure.

Unlike the image processing apparatus 100 according to the first embodiment, the image processing apparatus 100 according to the fourth embodiment performs the image separation by image processing. A redundant description of identical features in the first and fourth embodiments is herein omitted; whereas a description is now given of features of the fourth embodiment different from the features of the first embodiment.

FIG. 15 is a block diagram illustrating a configuration of the reading unit 1 and the image correction processing unit 2 of the image processing apparatus 100 according to the fourth embodiment.

In the reading unit 1 of the image processing apparatus 100 illustrated in FIG. 15, the image sensor 61 is provided with a visible spectrum cut filter 102. Visible spectrum cut filters exhibit a characteristic of cutting an image in the visible spectrum less than about 750 nm. By using the visible spectrum cut filter 102 in NIR image reading, the reading unit 1 acquires an image including a NIR spectrum alone.

As illustrated in FIG. 15, the reading unit 1 of the image processing apparatus 100 turns on the visible light source 63A and the invisible light source 63B of the light source 63 at one time to irradiate a document with light. The reading unit 1 reads the reflected light from the document with the image sensor 61. Then, visible and NIR signals indicating visible and invisible images read at one time are input into the image separating unit 62 together with a NIR signal indicating a NIR image.

The image separating unit 62 performs, e.g., masking operation by use of the visible and NIR signals and the NIR signal thus input, thereby separating the signals into RGB signals and a NIR signal.

The image correction processing unit 2 corrects the visible and NIR images thus separated by the image separating unit 62.

Note that the image separating unit 62 may be included in the image correction processing unit 2.

Thus, according to the present embodiment, the reading unit 1 turns on the visible light source 63A and the invisible light source 63B of the light source 63 at one time to read an image with a single scan, thereby reducing the user waiting time.

Referring now to FIGS. 16A to 16F, a description is given of a fifth embodiment of the present disclosure.

Unlike the image processing apparatus 100 according to the first embodiment, the image processing apparatus 100 according to the fifth embodiment determines a bleed-through removal intensity by use of a bleed-through intensity characteristic. A redundant description of identical features in the first and fifth embodiments is herein omitted; whereas a description is now given of features of the fifth embodiment different from the features of the first embodiment.

Initially, a description is given of the parameter setting according to the image characteristic difference. In the present embodiment, the gamma correcting unit 64 performs the bleed-through removal by use of a bleed-through intensity difference between the visible and invisible images, that is, a difference between a bleed-through intensity of the visible image and a bleed-through intensity of the invisible image, thereby equalizing the bleed-through intensities of the visible and invisible images.

Referring now to FIGS. 16A to 16F, a description is given of the determination of the bleed-through removal intensity by use of the bleed-through intensity characteristic in the image processing apparatus 100 according to the fifth embodiment.

Figure 16A:
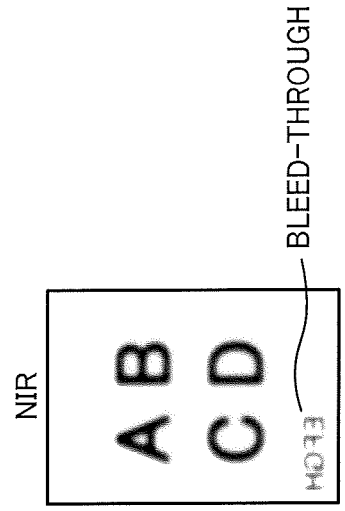
FIG. 16A is a diagram illustrating front and back sides of an input document.
Figure 16B:
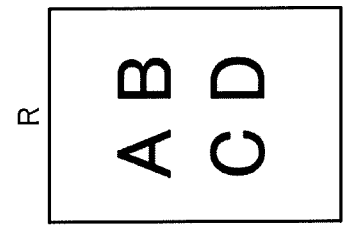
FIG. 16B is a diagram illustrating an R image of the input document acquired by visible image reading.
Figure 16C:
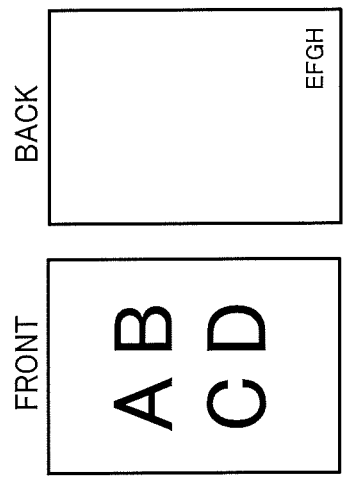
FIG. 16C is a diagram illustrating a NIR image of the input document acquired by invisible image reading.

Initially with reference to FIGS. 16A to 16C, a description is given of a bleed-through issue in visible image reading and invisible image reading.

FIG. 16A is a diagram illustrating front and back sides of an input document.

As illustrated in FIG. 16A, the front side of the input document includes black letters A, B, C, and D. The back side of the input document includes black letters E, F, G, and H.

FIG. 16B is a diagram illustrating an R image of the input document acquired by visible image reading. Although FIG. 16B illustrates the R read image alone, G and B read images are substantially the same as the R read image.

FIG. 16C is a diagram illustrating a NIR image of the input document acquired by invisible image reading. As illustrated in FIG. 16C, the invisible (or NIR) image reading exhibits a greater bleed-through than a bleed-through in the visible image reading.

Figure 16D:
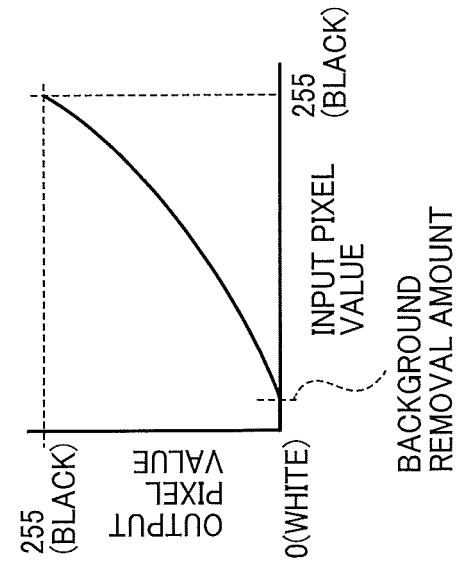
FIG. 16D is a graph illustrating a general gamma correction.
Figure 16E:
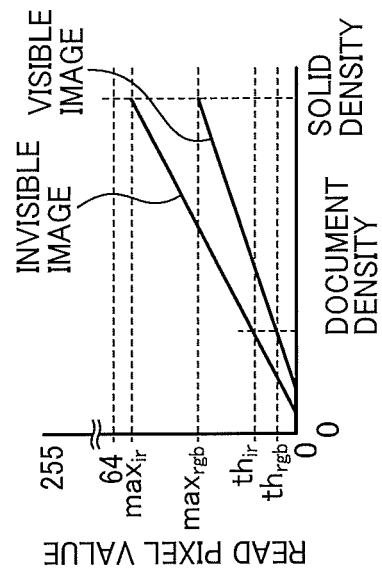
FIG. 16E is a graph illustrating acquired bleed-through characteristics of a target scanner.
Figure 16F:
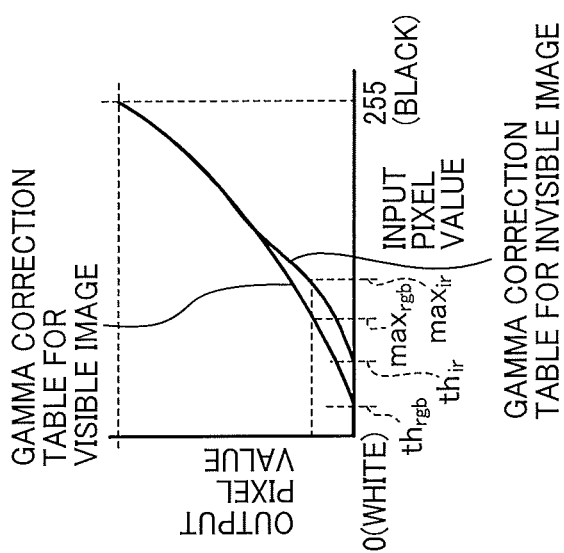
FIG. 16F is a graph illustrating a gamma correction by use of a characteristic difference according to a fifth embodiment of the present disclosure.

Referring now to FIGS. 16D to 16F, a description is given of bleed-through removal by gamma correction by use of the image characteristic difference between the visible and invisible images.

FIG. 16D is a graph illustrating a general gamma correction.

The gamma correction converts pixel values with a conversion table of an output pixel value to an input pixel value being 1 to 1. The gamma correction may also whiten a document background.

FIG. 16E is a graph illustrating acquired bleed-through characteristics of a target scanner.

The bleed-through characteristics indicate a relationship between the document density and the read pixel value obtained when reading the density from the back side of the document. For example, the bleed-through characteristics are acquired, as visible and invisible bleed-through characteristics, from the relationship between the document density and the read pixel value upon visible and invisible image scanning of a white front side of a patch document, which bears a gradation on a back side. A gamma correction table may be generated to fill a characteristic difference between the visible and invisible bleed-through characteristics.

FIG. 16F is a graph illustrating a gamma correction by use of the characteristic difference according to the fifth embodiment.

In the present embodiment, firstly, the gamma correcting unit 64 acquires, from the bleed-through characteristics, a read pixel value $\max_{rgb}$ of a solid-density visible image and a read pixel value $\max_{ir}$ of a solid-density invisible image. The gamma correcting unit 64 adjusts a gamma correction table for an invisible image (hereinafter referred to as an invisible image gamma correction table) such that the output pixel value with an input pixel value $\max_{ir}$ approaches the output pixel value with an input pixel value $\max_{rgb}$.

In addition, the gamma correcting unit 64 adjusts a background removal threshold value of the invisible image gamma correction table with a background removal amount $th_{ir}$ for the invisible image. The background removal amount $th_{ir}$ is a read pixel value acquired by the invisible image reading with respect to the document density removed from the background of the visible image. Note that, in FIG. 16F, $th_{rgb}$ represents a background removal amount for the visible image.

Thus, the present embodiment adjusts a gamma of a portion of the invisible image exhibiting lower background removal intensity and contrast than those of the visible image, thereby equalizing the bleed-through intensities of the visible and invisible images.

Referring now to FIGS. 17 to 19D, a description is given of a sixth embodiment of the present disclosure.

Unlike the image processing apparatus 100 according to the first embodiment, the image processing apparatus 100 according to the sixth embodiment includes an image synthesizing unit 151 in the image correction processing unit 2 to incorporate an invisible image into a visible image. A redundant description of identical features in the first and sixth embodiments is herein omitted; whereas a description is now given of features of the sixth embodiment different from the features of the first embodiment.

Figure 17:
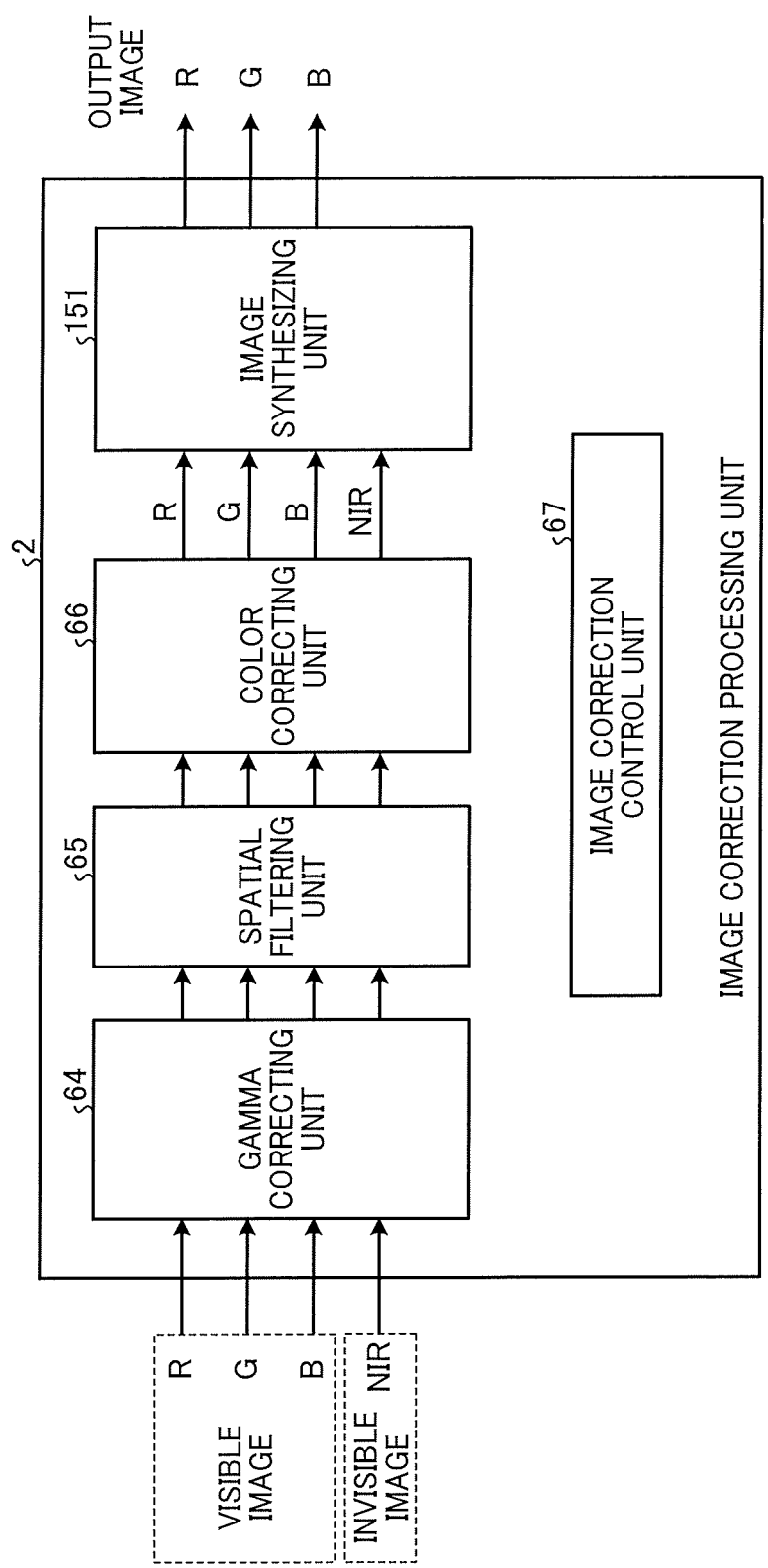
FIG. 17 is a block diagram illustrating a configuration of the image correction processing unit of the image processing apparatus according to a sixth embodiment of the present disclosure.

FIG. 17 is a block diagram illustrating a configuration of the image correction processing unit 2 of the image processing apparatus 100 according to the sixth embodiment.

As illustrated in FIG. 17, the image correction processing unit 2 of the image processing apparatus 100 includes the image synthesizing unit 151 that incorporates an invisible image into a visible image.

In contrast to visible images, invisible images are in a spectrum without a human visual sensitivity. Therefore, the invisible images are generally treated as data without color information. The image synthesizing unit 151 synthesizes visible and invisible images corrected. Such image synthesis reduces the data amount stored by, e.g., users. In addition, since the synthesized image is treated as a general RGB image, image handling is simplified.

Figure 18:
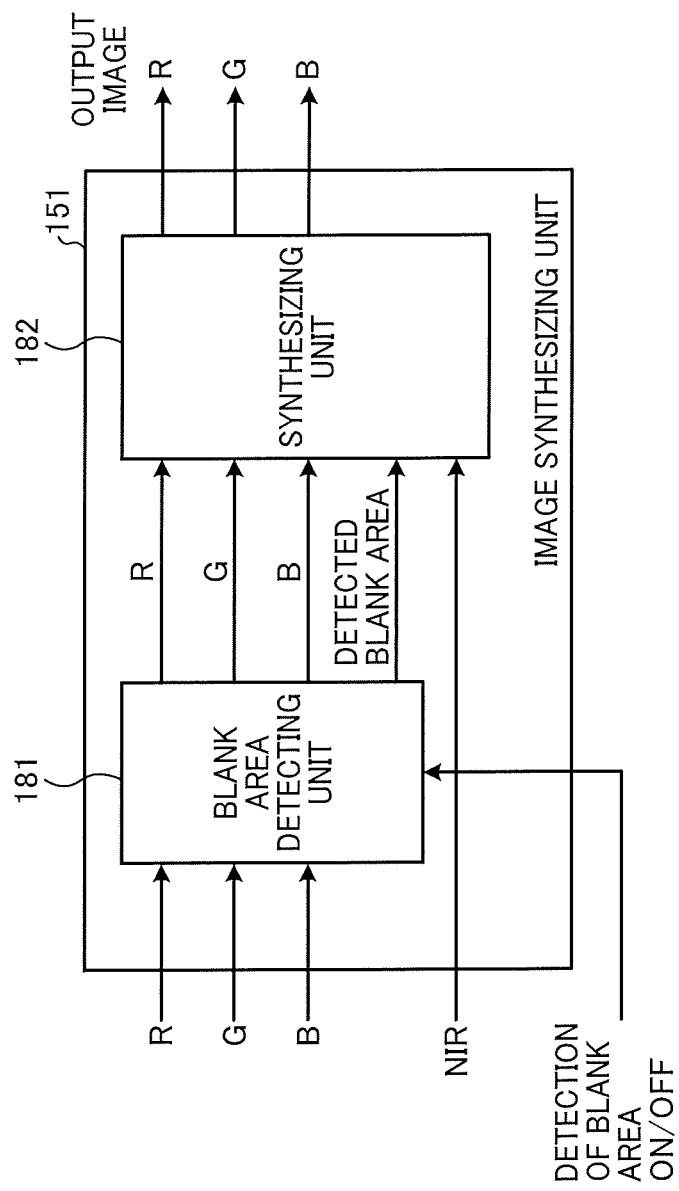
FIG. 18 is a block diagram illustrating a configuration of an image synthesizing unit in the image correction processing unit according to the sixth embodiment.

Referring now to FIGS. 18 to 19D, a description is given of a synthesizing process performed by the image synthesizing unit 151 according to the sixth embodiment.

FIG. 18 is a block diagram illustrating a configuration of the image synthesizing unit 151 in the image correction processing unit 2 according to the sixth embodiment. The image synthesizing unit 151 places an invisible image into a blank area, thereby synthesizing visible and invisible images.

When a visible image and an invisible image are synthesized so as to overlap each other, the invisible image affects the visible image. As a consequence, the synthesized image is hard for users to read. To address such a situation, the image synthesizing unit 151 detects a blank area in a visible image. The image synthesizing unit 151 then moves an invisible image into the blank area detected. Thus, the image synthesizing unit 151 synthesizes the visible and invisible images. That is, the image synthesizing unit 151 superimposes invisible information on an area that does not affect the visible image, thereby enhancing the readability for, e.g., users. In addition, the present embodiment omits the need for, e.g., a user to designate a synthesis position for each document, thereby enhancing user-friendliness.

As illustrated in FIG. 18, the image synthesizing unit 151 includes a blank area detecting unit 181 and a synthesizing unit 182. In response to setting the detection of a blank area ON by, e.g., a user, the blank area detecting unit 181 detects a blank area in an input RGB image (i.e., visible image). The blank area detecting unit 181 outputs the blank area thus detected to the synthesizing unit 182.

The synthesizing unit 182 extracts an image area from an input NIR image (i.e., invisible image) to place the image area in the blank area detected.

Referring now to FIGS. 19A to 19D, a description is given of a way of the image synthesis with detection of a blank area.

FIG. 19A is a diagram illustrating an input document image. The document includes a visible image area and an invisible image embedded area. In the invisible image embedded area of FIG. 19A, the star mark indicates a visible image. The letter "V" inside the star mark is an invisible image embedded as a latent image in the visible image.

FIG. 19B is a diagram illustrating a visible image of the input document acquired by visible image reading. In the visible image reading, visible information of the document is read.

FIG. 19C is a diagram illustrating an invisible image of the input document acquired by invisible image reading. In the invisible image reading, the embedded letter "V" is read. FIG. 19C illustrates an area including the letter "V" as a block to be extracted.

FIG. 19D is a diagram illustrating a blank-area synthesized image in which the invisible image is placed in a blank area of the visible image. Specifically, FIG. 19D illustrates the block including the letter "V" placed at the center of the blank area detected by the blank area detecting unit 181. Note that the synthesis position to place the invisible image is not limited to the center of the blank area. That is, the synthesis position can be anywhere in the blank area. When a plurality of blank areas is detected, the invisible image may be placed in a largest blank area or a closest blank area. In short, the synthesis position is not limited to a specific blank area. When the blank area is smaller than the incorporated image (i.e., block including the letter "V"), the block may be placed at the center of the blank area while overlapping a peripheral image. Alternatively, the block may be placed at an original position regardless of the blank area detected.

Thus, according to the present embodiment, incorporation of the invisible image into the visible image generates a visible image with invisible information. In addition, the present embodiment reduces the data amount stored by, e.g., users, and simplifies the image handling. The present embodiment also provides hardware advantages because the images can be handled in a typical processing system.

Further, in the present embodiment, the image synthesizing unit 151 recognizes a blank area and places an image in the blank area. Thus, the image synthesizing unit 151 places invisible image information at a position that does not affect a visible image. Furthermore, the present embodiment omits the need for, e.g., a user to designate the synthesis position, thereby enhancing user-friendliness.

Referring now to FIGS. 20 to 22D, a description is given of a seventh embodiment of the present disclosure.

Unlike the image processing apparatus 100 according to the sixth embodiment, the image processing apparatus 100 according to the seventh embodiment determines a color of an invisible image subjected to the image synthesis, according to a color selection by, e.g., a user. A redundant description of identical features in the first to seventh embodiments is herein omitted; whereas a description is now given of features of the seventh embodiment different from the features of the first to sixth embodiments.

Figure 20:
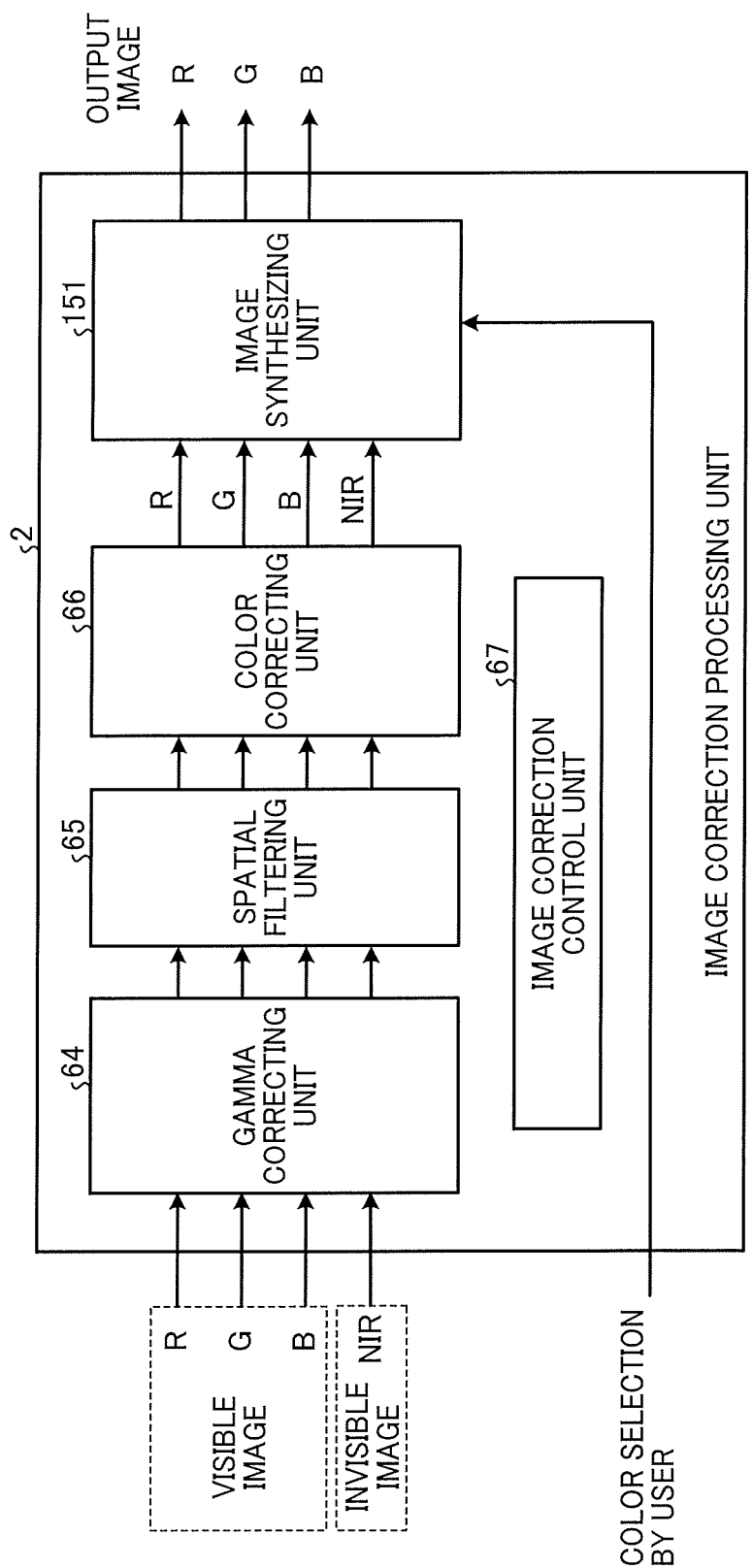
FIG. 20 is a block diagram illustrating a configuration of the image correction processing unit of the image processing apparatus according to a seventh embodiment of the present disclosure.

FIG. 20 is a block diagram illustrating a configuration of the image correction processing unit 2 of the image processing apparatus 100 according to the seventh embodiment.

As illustrated in FIG. 20, the image synthesizing unit 151 receives color information indicating a color selected by, e.g., a user. The image synthesizing unit 151 colors a NIR image (i.e., invisible image) according to the color information before synthesizing the NIR image and an RGB image (i.e., visible image). By incorporating the NIR image (i.e., invisible image) of a user-desired color into the RGB image (i.e., visible image), the image synthesizing unit 151 renders the visible information and the invisible information of the document clearly distinguishable in the synthesized image.

Figure 21:
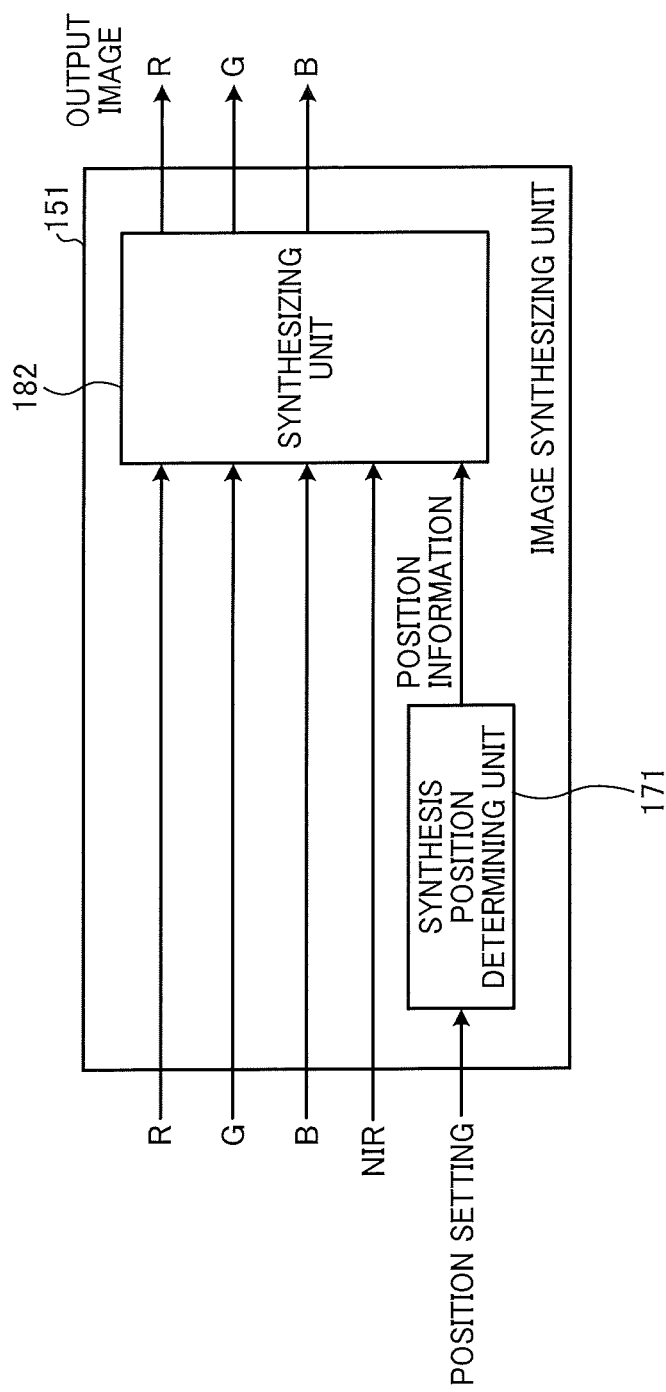
FIG. 21 is a block diagram illustrating a configuration of the image synthesizing unit in the image processing apparatus according to the seventh embodiment.

Referring now to FIGS. 21 to 22D, a description is given of an image synthesizing process performed by the image synthesizing unit 151 according to the seventh embodiment.

FIG. 21 is a block diagram illustrating a configuration of the image synthesizing unit 151 in the image processing apparatus 100 according to the seventh embodiment.

As illustrated in FIG. 21, the image synthesizing unit 151 includes a synthesis position determining unit 171 and the synthesizing unit 182. When, e.g., a user desires to designate an image synthesis position, the user inputs synthesis position setting information. The synthesis position determining unit 171 determines coordinates of the synthesis position and outputs position information to the synthesizing unit 182.

The synthesizing unit 182 extracts an image area from a NIR image (i.e., invisible image) received. Then, the synthesizing unit 182 performs the image synthesizing process based on the position information.

Referring now to FIGS. 22A to 22D, a description is given of a way of the image synthesis with designation of the synthesis position.

FIG. 22A is a diagram illustrating an input document. The document includes a visible image area and an invisible image embedded area. In the invisible image embedded area of FIG. 22A, the star mark indicates a visible image. The letter "V" inside the star mark is an invisible image embedded as a latent image in the visible image.

FIG. 22B is a diagram illustrating a visible image of the input document acquired by visible image reading. In the visible image reading, the visible information of the document is read.

FIG. 22C is a diagram illustrating an invisible image of the input document acquired by invisible image reading. In the invisible image reading, the embedded letter "V" is read. FIG. 22C illustrates an area including the letter "V" as a block to be extracted.

FIG. 22D is a diagram illustrating a position-designated synthesized image in which the invisible image is positioned as designated by, e.g., a user. In a case in which the user does not designate the synthesis position, the images are located and synthesized as in the input document. In the present embodiment, the visible and invisible images are synthesized at identical positions. In such a case, the invisible image overlapping the visible image causes difficulties for users in reading a visible read image. To address such a situation, the present embodiment allows the users to set, in advance, a synthesis area to place an invisible image, thereby moving the invisible image to a given position (e.g., (x, y) coordinates in FIG. 22D). Accordingly, the present embodiment enhances the readability for the users.

As described above, in the present embodiment, the image synthesizing unit 151 colors an invisible image as desired by, e.g., a user, thereby rendering the visible information and the invisible information of a document clearly distinguishable.

In addition, the image synthesizing unit 151 places an invisible image at a position designated by, e.g., a user. In other words, the image synthesizing unit 151 moves the invisible image to a position where the invisible image is easy to read.

Note that, in the embodiments described above, the image processing apparatus 100 has been described as applicable to an MFP having at least two of copying, printing, scanning, and facsimile functions. Alternatively, the image processing apparatus 100 may be applied to a copier, a printer, a scanner, a facsimile machine, or the like.

Alternatively, the image processing apparatus 100 may be applied to applications in various fields, such as inspection in a factory automation (FA) field.

Alternatively, the image processing apparatus 100 may be applied to a bill scanner that discriminates bills and used to prevent the forgery. Alternatively, the image processing apparatus 100 may be applied to an apparatus that reads visible and invisible images and performs some processing in a subsequent step.

According to the embodiments of the present disclosure, an image is separated into a visible image and an invisible image before different image correction processes are performed on the visible image and the invisible image, respectively. Accordingly, the invisible image quality is restored to be equivalent to the visible image quality. Thus, the images are providable to users.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. An image processing apparatus, comprising:
   a sensor configured to read an image by reading a visible spectrum and an invisible spectrum of the image; and
   circuitry configured to
     separate the read image into a visible image and an invisible image; and
     perform a particular image correction process on the visible image using a first parameter determined based on an image characteristic of the visible image, and perform the particular image correction process on the invisible image using a second parameter determined based on an image characteristic of the invisible image.

2. The image processing apparatus according to claim 1, wherein the circuitry is further configured to select a mode to acquire a given image, and
   wherein the circuitry is further configured to switch between first and second image correction processes, according to the mode selected, for the visible image and the invisible image.

3. The image processing apparatus according to claim 1, further comprising a visible light source and an invisible light source,
   wherein the circuitry is further configured to switch between the visible light source and the invisible light source.

4. The image processing apparatus according to claim 1, wherein the circuitry is further configured to retain a difference between the image characteristic of the visible image and the image characteristic of the invisible image, and correct the visible image and the invisible image according to a parameter corresponding to the difference.

5. The image processing apparatus according to claim 4, wherein the circuitry is further configured to perform spatial filtering with a parameter having a restoration intensity corresponding to a difference between a modulation transfer function (MTF) intensity of the Visible image and an MTF intensity of the invisible image.

6. The image processing apparatus according to claim 1, further comprising an optical filter,
   wherein the circuitry is further configured to cause the optical filter to cut the invisible image.

7. The image processing apparatus according to claim 6, wherein the circuitry is further configured to perform gamma correction with a parameter having a restoration intensity corresponding to a difference between a bleed-through intensity of the visible image and a bleed-through intensity of the invisible image.

8. The image processing apparatus according to claim 1, wherein the circuitry is further configured to perform image separation by image processing.

9. The image processing apparatus according to claim 1, wherein the circuitry is further configured to incorporate the corrected invisible image into the corrected visible image.

10. The image processing apparatus according to claim 9, wherein the circuitry is further configured to detect a blank area in the visible image and incorporate the invisible image into the blank area.

11. The image processing apparatus according to claim 9, wherein the circuitry is further configured to color the invisible image and incorporate the colored invisible image into the visible image.

12. The image processing apparatus according to claim 9, wherein the circuitry is further configured to place the invisible image at a position in the visible image.

13. An image forming system comprising:
    the image processing apparatus according claim 1; and
    an image forming device configured to form an image.

14. An image processing method, comprising:
    reading an image by reading a visible spectrum and an invisible spectrum of the image;
    separating the read image into a visible image and an invisible image; and
    performing a particular image correction process on the visible image using a first parameter determined based on an image characteristic of the visible image, and performing the particular image correction process on the invisible image, using a second parameter determined based on an image characteristic of the invisible image.

15. A non-transitory, computer-readable storage medium storing computer-readable program code that causes a computer to perform an image processing method, the method comprising:
    reading an image by reading a visible spectrum and an invisible spectrum of the image;
    separating e read image into a visible image and an invisible image; and
    performing a particular image correction process on the visible image using a first parameter determined based on an image characteristic of the visible image, and performing the particular image correction process on the invisible image using a second parameter determined based on an image characteristic of the invisible image.

16. The image processing apparatus of claim 1, wherein the circuitry is further configured to, in performing the particular image correction process on the visible and invisible images, apply a first spatial filter to the visible image and a second spatial filter to the invisible image, the first spatial filter being different from the second spatial filter.

17. The image processing apparatus of claim 1, wherein the circuitry is further configured to, in performing the particular image correction process on the visible and invisible images, apply a first image processing to an entirety of the visible image and apply a second image processing, different from the first image processing, to an entirety of the invisible image.

18. The image processing apparatus of claim 1, wherein the circuitry is further configured to perform different image correction processes on the visible image and the invisible image, respectively, so as to correct the visible image and correct the invisible image to match the image characteristic of the visible image with the image characteristic of the invisible image.

19. The image processing apparatus of claim 1, wherein the circuitry is further configured to perform spatial filtering with a parameter having a restoration intensity corresponding to a difference between a modulation transfer function (MTF) intensity of the visible image and an MTF intensity of the invisible image.

* * * * *